US010289715B1

United States Patent
Ledet

(10) Patent No.: US 10,289,715 B1
(45) Date of Patent: May 14, 2019

(54) COLOR BASED SEARCH APPLICATION INTERFACE AND CORRESPONDING QUERY CONTROL FUNCTIONS

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 481 days.

(21) Appl. No.: 14/331,312

(22) Filed: Jul. 15, 2014

Related U.S. Application Data

(60) Provisional application No. 61/856,291, filed on Jul. 19, 2013, provisional application No. 61/856,131, filed on Jul. 19, 2013.

(51) Int. Cl.
  *G06F 17/30* (2006.01)
(52) U.S. Cl.
  CPC .. *G06F 17/30395* (2013.01); *G06F 17/30646* (2013.01)
(58) Field of Classification Search
  None
  See application file for complete search history.

(56) References Cited

U.S. PATENT DOCUMENTS

| | | | | |
|---|---|---|---|---|
| 5,982,369 | A  * | 11/1999 | Sciammarella | G06F 17/30696 345/440 |
| 8,112,435 | B2 * | 2/2012 | Epstein | G06Q 30/0256 707/706 |
| 8,280,901 | B2 * | 10/2012 | McDonald | G06F 17/30696 707/706 |
| 8,576,241 | B1 * | 11/2013 | Kanter | G06F 17/3025 345/589 |
| 8,868,590 | B1 * | 10/2014 | Donneau-Golencer | G06F 17/3053 707/733 |
| 9,342,598 | B1 * | 5/2016 | Maeng | G06F 17/30864 707/722 |
| 2005/0028156 | A1 * | 2/2005 | Hammond | G06F 17/30699 718/100 |

* cited by examiner

*Primary Examiner* — James Trujillo
*Assistant Examiner* — Cheryl M Shechtman

(57) ABSTRACT

Search queries may be received and optimized prior to performing the search and returning results. One example method of operation includes receiving a search query input from a user device including at least one search term, querying a database to access a user account associated with the user device, retrieving at least one pre-stored search criteria from the user account, combining the pre-stored search criteria with the search query input to create a modified search query input, and transmitting the query to a search application.

17 Claims, 33 Drawing Sheets

300

400

| User Database | |
|---|---|
| Personal | |
| Sex | Male |
| Age | 35 |
| City | Plano |
| State | Texas |
| Main Activity | Running |
| Minor Activity | Racquetball |
| Medical | |
| Blood Type | O+ |
| Medical Issues | High Blood Pressure Asthma |
| Height | 6'2" |
| Weight | 205 lbs |
| Activity Specifics | |
| Preferred Running Shoe | Asics |
| Preferred Running Type | Trails |
| Preferred Running Distance | 5 miles |
| ... | |

| User Database | |
|---|---|
| Products | |
| Preferred shipping cost | Less than [#] % |
| Most trusted sites | [List of websites] |
| Least trusted sites | [List of websites] |
| Current availability | [Yes, No, Don't Care] |
| Time to ship | Less than [number days] |
| Product Tax allowance | [Yes, No, Don't Care] |
| Food | |
| Proximity | [#] miles |
| Previously Visited | [Yes, No, Don't Care] |
| Serve alcohol | [Yes, No, Don't Care] |
| User Reviews | [#] % Positive reviews |
| Appointments | |
| Availability | [#] [days/weeks/months] |
| Proximity | [#] miles |
| Preferred Day(s) | [Mon/Tues/Wed/Thurs/Fri] |
| Preferred Time | [Morning/Afternoon] |
| Physician | |
| Experience | [#] years |
| Preferred Times | [Morning/Afternoon] |
| Distance | [#] miles |
| Accepted Insurance | [Insurance Company] |
| Preferred Medical Schools | [List of Medical Schools] |
| Rating | [#] % Positive reviews |
| Sex | [Male/Female] |
| Acceptable Medical Facilities | [List of Medical Facilities] |

| | Value | Description | Example |
|---|---|---|---|
| 612 | Click time | Time of the click in 100ths of a second since midnight on January 1, 1970. | 125001323979 |
| 614 | IP address | IP address of the user who clicked. | 172.18.75.121 |
| 616 | Session ID | Holding place for session ID, always blank. | |
| 618 | Click type | Type of action, which can be a user click or other action. | c |
| 620 | Click start | The results page of the user click, where 0=1st page of results. | 0 |
| 622 | Click rank | The rank of the result on the page of the user click, where 1=the 1st result, 2=2nd result, and so on. A smaller number click rank indicates higher user click satisfaction. | 1 |
| 624 | Click data | Usually blank. | |
| 626 | Query | Search query that returned results. | Google+Search+Appliance |
| 628 | URL | URL of the user click. | http://www.google.com/ |

| Store Action Message | |
|---|---|
| Time | 12/02/2013 14:22:24 |
| Website | Amazon.com |
| Action | Purchase |
| Product Area | Electronics |
| Item | Otterbox Ipad Case |
| Item | Screenit Ipad Screen Protector |

| Historical Database Table | | | |
|---|---|---|---|
| Date | Action | Product Area | Business Entity |
| 01312013-175603 | Purchase | Media | Itunes |
| 02012013-090323 | Purchase | Electronics | Amazon.com |
| 02162013-132355 | Reservation | Restaurant | Texas Land and Cattle |
| 02202013-132554 | Purchase | Office Supplies | Staples.com |

| Query Historical Message | |
|---|---|
| Time | 12/02/2013 14:32:45 |
| Action | Purchase |
| Product Area | Media |
| Category | DVD |

| Selection Criteria Area | Level (Example 1) | Level (Example 2) | Level (Example 3) |
|---|---|---|---|
| Green | 5 | 10 | 10 |
| Yellow | 5 | 5 | 5 |
| Red | 5 | 1 | 0 |

FIG. 22C

COLOR BASED SEARCH APPLICATION INTERFACE AND CORRESPONDING QUERY CONTROL FUNCTIONS

CROSS-REFERENCE TO RELATED APPLICATION

This application claims priority to earlier filed provisional application No. 61/856,291 filed Jul. 19, 2013 and entitled "COLOR BASED SEARCH FUNCTIONALITY" and provisional application no. 61/856,131 filed Jul. 19, 2013 and entitled "COLOR BASED PROGRESS INDICATOR", the entire contents of which are hereby incorporated by reference.

TECHNICAL FIELD OF THE APPLICATION

This application relates to preparing and performing a modified query to a user submitted query based on known user information and more particularly to customizing a user submitted query and providing a user interface with options for selecting and viewing the query results.

BACKGROUND OF THE APPLICATION

Conventionally, when a user searches for a topic using a search engine on a computing device, the user's personal, relevant information is not taken into account in the search. The search engine receives as input the user's search terms only with the exception of the user's geographic location in some of the newer search engine algorithms. While the geographic location permits the search engine to return more relevant information in the results, there are other relevant data items that could be utilized to allow the search engine to return vastly more relevant search results and organize, prioritize and deliver the results in an increasingly optimized manner.

When searching the Internet, users have different choices as to which web search engine to utilize. This set of different engine options was not always available. The web's first primitive search engine, release on Sep. 2, 1993 was named 'W3Catalog', and was a series of Perl scripts that periodically mirrored pages and rewrote them into a standard format. While unrefined in its ability to return search results, this first search engine served as the beginning of what would later be known as "web searching". Another search engine WEBCRAWLER entered the market in 1994, which permitted users to search for any word in any webpage, which has become the standard for all major search engines since. WEBCRAWLER was also the first search function widely known by the public.

In the year 2000, GOGGLE entered the search engine market and rose to prominence as the search engine of choice. The company achieved better results for many searches with an innovation called PageRank, which was an iterative algorithm that ranks web pages based on the number and page ranking of other web sites and pages that link to it accordingly. This configuration was based on the premise that good or desirable pages are linked to more than others. GOOGLE also provided a minimalist interface to its search engine. In contrast, many of its competitors embedded a search engine in a web portal. By the year 2000, YAHOO! was providing search services based on INKTOMI's search engine. YAHOO! acquired INKTOMI in 2002, and OVERTURE (which owned ALLTHEWEB and ALTAVISTAO) in 2003. YAHOO! switched to GOOGLE's search engine in 2004, when it launched its own search engine based on the combined technologies of its acquisitions.

MICROSOFT first launched MSN search in the fall of 1998 using search results from INKTOMI. In early 1999, the site began to display listings from LOOKSMART, blended with results from INKTOMI. For a short time in 1999, MSN Search used results from ALTAVISTA instead. In 2004, MICROSOFT began a transition to its own search technology, powered by its own web crawler called MSNBOT. MICROSOFT's rebranded search engine, BING, was launched on Jun. 1, 2009. On Jul. 29, 2009, YAHOO! and MICROSOFT finalized a deal in which YAHOO! search would be powered by MICROSOFT BING technology.

Today there are many search engines available for use, but two search engines that have risen to the top in terms of popularity are MICROSOFT BING and GOOGLE. These search engines return many pages having many results while retaining a familiar format. Currently, the results of the search are returned on the left side of the results page, a local map that is locally positioned to the user's geographic location may display any local merchants offering the searched terms, and advertisements related to the search term listed on the right side of the page. Also, the most relevant matches are provided on the first page of the search results, which is often the only useful page for the user and the subsequent pages are not utilized at all.

SUMMARY OF THE APPLICATION

One example embodiment may provide receiving a search query input from a user device comprising at least one search term, querying a database to access a user account associated with the user device, retrieving at least one pre-stored search criteria from the user account, combining the pre-stored search criteria with the search query input to create a modified search query input, and transmitting the query to a search application.

Another example embodiment may include an apparatus with a receiver configured to receive a search query input from a user device comprising at least one search term and a processor configured to query a database to access a user account associated with the user device, retrieve at least one pre-stored search criteria from the user account, combine the pre-stored search criteria with the search query input to create a modified search query input, and a transmitter configured to transmit the query to a search application.

Another example embodiment may include a method that provides receiving a search query input from a user device comprising at least one search term querying a history database to access previous queries related to the search query input, performing the query based on the search query input, and categorizing results of the query based on the previous queries and a user specified priority of information.

Another example embodiment may include an apparatus that includes a receiver configured to receive a search query input from a user device comprising at least one search term, and a processor configured to query a history database to access previous queries related to the search query input, perform the query based on the search query input, categorize results of the query based on the previous queries and a user specified priority of information.

Another example embodiment may include a method that includes receiving a search query input from a user device comprising at least one search term, querying a history database to access previous queries related to the search query input, performing a query based on the search query input, categorizing results of the query based on the previous queries and a previous selection operation performed by the user, and displaying a plurality of search results in a user interface comprising a plurality of different selection options each related to a topic of the search query.

Yet another example embodiment may include an apparatus that includes a receiver configured to receive a search query input from a user device comprising at least one search term, and a processor configured to query a history database to access previous queries related to the search query input, perform a query based on the search query input, categorize results of the query based on the previous queries and a previous selection operation performed by the user, and display a plurality of search results in a user interface comprising a plurality of different selection options each related to a topic of the search query.

BRIEF DESCRIPTION OF THE DRAWINGS

FIG. 4 illustrates a table of sample user data according to an example embodiment of the present application.

FIG. 5 illustrates another table of sample user data according to an example embodiment of the present application.

FIG. 6 illustrates a table of recorded user click data according to an example embodiment of the present application.

FIG. 10 illustrates an example table of stored action messages according to an example embodiment of the present application.

FIG. 11 illustrates a table of entries in a historical database according to an example embodiment of the present application.

FIG. 13 illustrates a table of query history messages according to an example embodiment of the present application.

FIG. 22C illustrates a table with various different levels according to example embodiments of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, when the user performs a query by submitting search terms or other information into a search application operating on a device's search page, the local user-data 'user-database' may be used to rank the results of the query. Personal and relevant data is submitted by the user and stored either locally or remotely to the user. The more information entered into the user-database, the more relevant the search results will become. The database is configured by the user and retains the user's personal interest(s) and other data that is used by the system in search queries. This database may contain any personal data related to the user. The examples included in this disclosure serve only to exemplify the types of information a user may utilize in storing personal information and performing corresponding queries. Other types of information and examples may be used without deviating from the scope of the present application.

Figure 1:
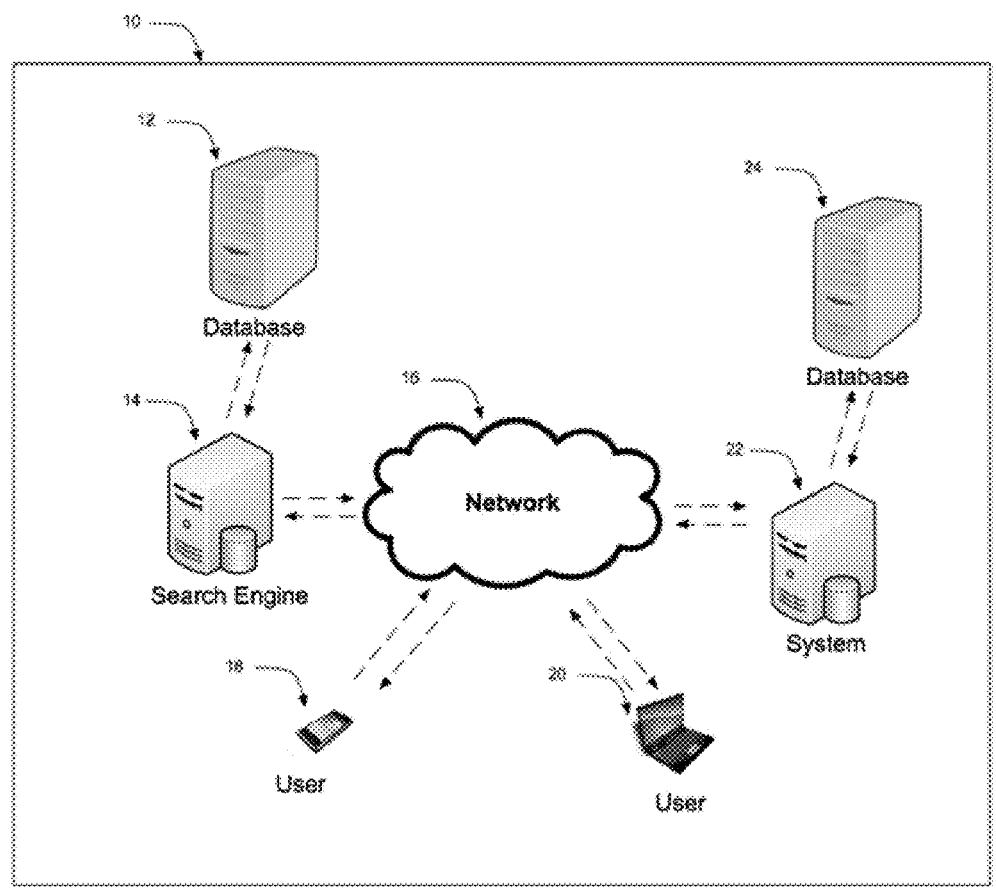
FIG. 1 illustrates a system diagram according to an example embodiment of the present application.

FIG. 1 illustrates a system diagram used in accordance with example embodiments of the present application. Referring to FIG. 1, the diagram 10 permits a user utilizing a mobile client machine 12 or a more traditional computer 20 to access the current application in the form of software, for example, to be downloaded from the system server 22 and operated by the client device 18/20.

The client device 18/20 can be any of a mobile laptop device and/or a personal desktop computer or a mobile device. The computing device 18 is connected to the network 16. It should be noted that other types of devices, in addition to devices 18/20, might be used with the present invention. For example, a PDA, a tablet computer, a laptop, an MP3 player, a gaming device, such as a hand held device or home based device and the like including a P.C. or other wired device that can also transmit and receive information could be used with the present application.

The user of the application will interface with the client device 18/20 and connect through the network 16 to the system 22. The system 22 can be redundant, or include more than a single entity without deviating from the scope of the application. A database 24 is directly connected to the system or connected remotely through the network 16 without deviating from the scope of the application. The search engine 14 communicates with the network 16 and can be redundant, or may be operated by more than a single entity without deviating from the scope of the invention. A database 12 is directly connected to the search engine 14 or may be connected remotely through the network 16.

The user-database can reside as part of the system 22 or a remote database 24 either directly connected to the system 22 or remotely through the network 16. The application resides completely or partially on the user's device 18/20 which can be a mobile device, but can also reside on a user's desktop computer, a personal digital assistant (PDA), tablet computer, or any other device containing a processor, memory, and an operating system. In addition, the application can reside either completely or partially on any one of the other elements in the system depicted in FIG. 1. For example, the system 22, the database 24, the search engine 14, the database 12, and/or the network 16. If the application resides on a mobile device, the application is downloaded through a platform, such as an application store or market location residing on the device or accessed via the device. The user provides input to a search webpage through voice or text that is converted to text and processed by the user's computer 18/20, a pointing device, a computer keyboard or any other commonly used input device. The current application can work with any device, such as a personal computer with a touch screen, a laptop with a touch screen, a personal computing tablet, a smartphone or any device with a processor, memory and a touch screen.

Example embodiments of the present application permit a user to perform searches (e.g., Internet, Intranet, database, or other sources) and receive response(s). Querying a user-database enables the application to return responses that are more pertinent to the user as querying of the user-database provides further search criteria that may be applied to the searches beyond the immediate input provided during the present search.

Figure 2:
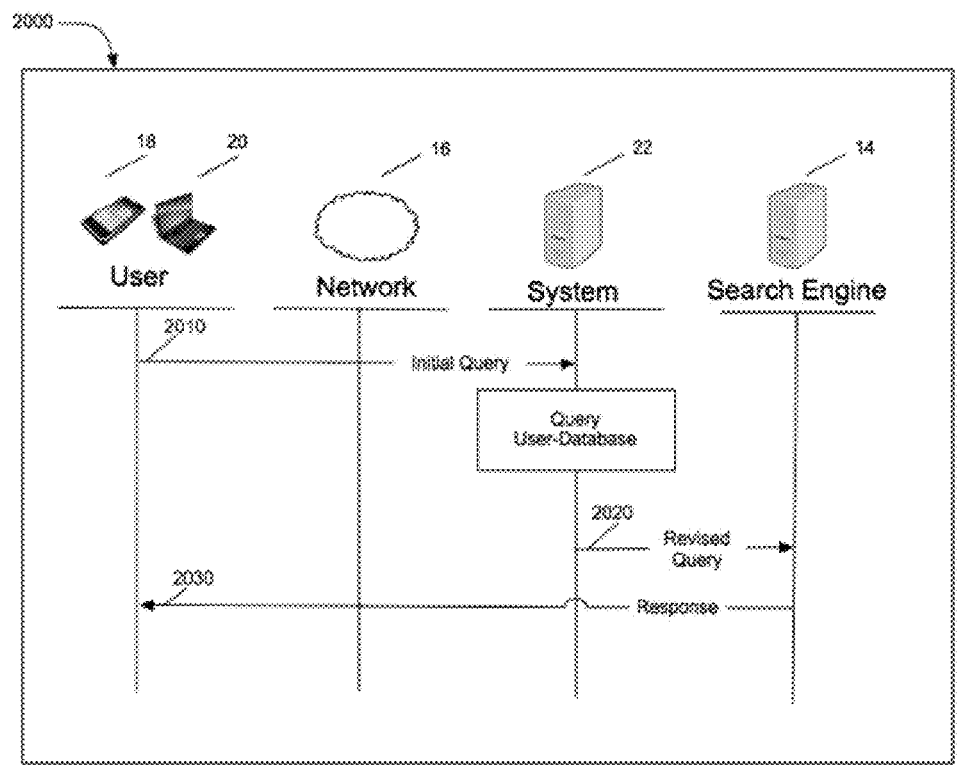
FIG. 2 illustrates a system signaling and message flow configuration according to an example embodiment of the present application.

FIG. 2 illustrates a system configuration diagram, the high-level message flow 2000 is depicted as a basic flow of information between the elements of a network. The user utilizes the application executing on device 18/20 to initiate a query 201 that is sent to the system 22. Prior to the query submission operation, the user device 18 would have provided the user-database with personalized data. This personalized data is established in a user-database, which stores information related to the user. The user configures the database through the application. The application has functionality that permits the user to initially configure and add/modify data in the user-database. Further embodiments below describe functionality of the establishment of the database and the procedures to add and/or modify the contents included in the database. Upon reception of the message, such as the initial query message 2010, the system server 22 may perform a query on the user-database. This database exists either inside the system server 22, or possibly a remote database. Upon obtaining additional user-related data from the user-database 22, a revised query 2020 is sent to the search engine 14. The result of the query is sent in a message, such as the response message 2030 that is sent to the user 18/20 through the network 16. The results are displayed on the user's device 18/20 based on a combination of the present user input and the pre-stored and known user data stored in the system database 22.

The user may navigate within a graphical user interface (GUI) operated on the user device 18/20. In the mobile device 18/20, the user accesses a GUI that can be an application on the mobile device that is downloaded from an app-store, or a webpage that is navigated via a browser on the mobile device. Other implementations of the GUI on the mobile device can be implemented by those versed in current mobile device application techniques without deviating from the scope of the application. In the desktop computer scenario, this GUI can be a local application residing on the storage of the computer, an application that is downloaded from the app-store on the computer, or a webpage that is accessed via a browser on the computer.

According to example embodiments, the application may perform at least the following features including configuration of the user-database, permitting the querying of search engines on the Internet, displaying the ranked results of the query, modifications of the user-database, etc. Each of these functionalities is depicted below in further detail to further explain the application functionality. Instead of performing simple search queries, the user can use the application to perform queries that reflect his/her personal information. In operation, the user queries the search engine through the application and the results may be delivered in a ranked order according to the specific personal information previously entered into the user-database. The user-database resides in a database either in the system server 22, or a database 24 communicatively coupled to the system server 22. Having the user-database operated remotely to the user device 18/20 permits the user with search application access, regardless of the device being utilized to perform search queries, as each of the devices utilized by the application will have access to the user-database 12/24 through the network 16. The user-database 12/24 stores information of the user. The user configures the database through the application on the user's device 18/20.

The application provides functionality that allows the user to initially configure and add/modify data in the user-database. The user-database 12/24 is utilized by the system server 22 when processing a query from the user device 18/20. The initial query is sent to the system server 22 that then submits a query to the user-database 12/24. The user-database, containing the personalized information of the user and related search criteria, enhances the query in order to obtain the more relevant data in the response to the user. For example, if the initial query contained the words "Rock Music", by querying the user-database, specific information pertaining to the user's preferences of music can be obtained. The user-database can contain a list of rock groups that the user prefers, or a listing of the genres of rock music previously accessed by the user. By combining these known search elements and topics with the original query, the query can be performed in a manner more specific to the user.

As a further detailed example, the words in the initial query "Rock Music" would be combined with the words "Alternative" assuming that the groups in the user-database were identified to be of the "Alternative" genre and/or a genre entry has "Alternative" included in the genre list. The word "download" could be included because the user-database had an entry that reflected the user having downloaded many songs from popular music sites and regularly prefers to obtain the music in that manner. In operation, the user device 18/20 configures the user-database through the application. The application displays the elements of the user-database in a form-based layout permitting the user to submit information into the user-database.

Figure 3:
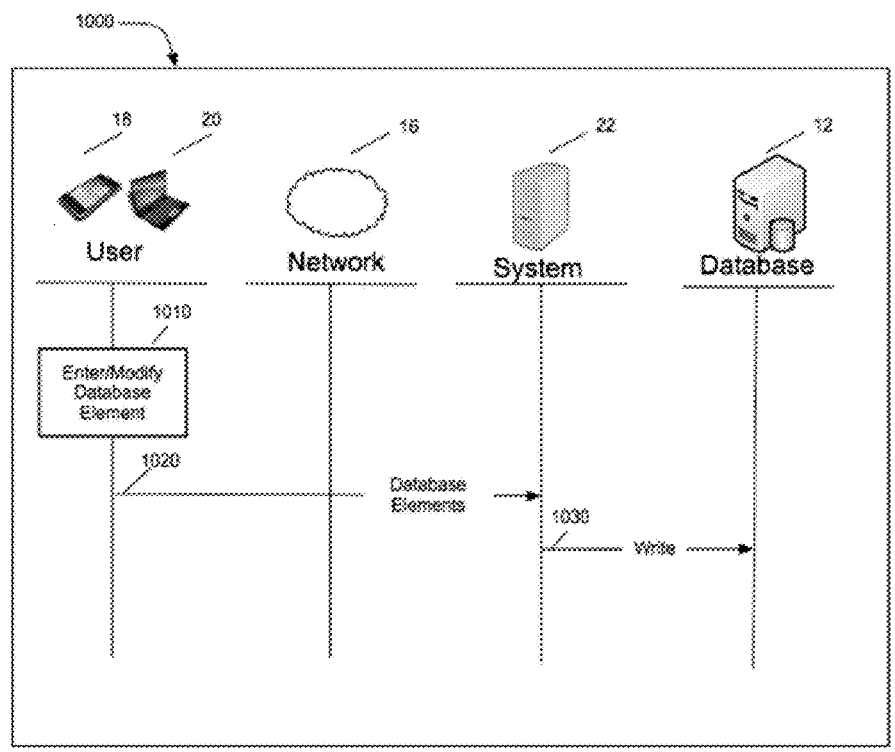
FIG. 3 illustrates a system signaling and message flow configuration with an add/modify user database function according to an example embodiment of the present application.

FIG. 3 illustrates a system communication flow diagram 1000 between the elements of the network. In this example, when the user device adds and/or modifies the user-database, data may be entered into the GUI to add or modify the individual elements in the table via 1010. The user device may be used to select an option, for example, "Submit" to send the new/modified data to the user-database. This action causes a message to be sent, such as a database element message 1020 to the system server 22. This message is routed through the network 16. Upon reception of the database elements message 1020, the system server 22 performs a database update on the user-database 12/24. A message, such as a write message 1030 is sent to the user-database 12/24 to add the user data to the table and row of the user-database, which can also reside in the system server 22 or a remote database 24 without deviating from the scope of the application.

FIG. 4 illustrates an example table 400 of the data stored in the user database profile. Examples of the user personal data that may be stored in the database and referenced responsive to a query initiated by the user device 18/20 may include, for example, Sex Male, Age 35, City Plano, State Texas, Main Activity Running, Minor Activity Racquetball, Medical, Blood Type 0+, Medical Issues High Blood Pressure, Asthma, Height 6'2", Weight 205 lbs., Activity Specifics, Preferred Running Shoe Asics, Preferred Running Type Trails, Preferred Running Distance 5 miles. Table 400 is an example of the user database 12/24 and corresponding user profile linked to the user device 18/20. Permitting the user to specify personal data that may be utilized by the system server 22 to return search results may provide results that are based on the specifically submitted search criteria and the user's known personal criteria. The system server 22 interfaces with the user database 12/24 when performing and processing the results returned from the search engines. This interaction permits the system server 22 to combine the results from the search engines with the data in the user database 12/24. The combination of the two sets of data permits the system server 22 to configure the results of the search at a more personal user level.

FIG. 5 illustrates another table 500 of sample user-database information. Referring to FIG. 5, the table above is another depiction of the user database 12/24, which provides possible entries submitted by the user. This example provides specific data that the user can pre-configure in the application. This data is utilized by the system server 22 when generating search results. For example, a 'Products' topic section may have various parameters, including, sub-topics and corresponding known parameters, such as 'Preferred shipping cost' Less than [#] %, Most trusted sites [List of websites], Least trusted sites [List of websites], Current availability [Yes, No, Don't Care], Time to ship, Less than [number days], Product Tax allowance [Yes, No, Don't Care], Food, Proximity [#] miles, Previously Visited [Yes, No, Don't Care], Serve alcohol, [Yes, No, Don't Care], User Reviews [#] % Positive reviews, Appointments, Availability [#] [days/weeks/months], Proximity [#] miles, Preferred Day(s) [Mon/Tues/Wed/Thurs/Fri], Preferred Time [Morning/Afternoon], Physician, Experience [#] years, Preferred Times [Morning/Afternoon], Distance [#] miles, Accepted Insurance [Insurance Company], Preferred Medical Schools [List of Medical Schools], Rating [#] % Positive reviews, Sex [Male/Female], Acceptable Medical Facilities, [List of Medical Facilities].

The data in this example of the user database 12/24 and corresponding user database profile permits the data to be entered by the user in the configuration portion of the application. This data may be presented to the user in the form of dropdown components in the configuration interface portion of the application. The user is now able to select the specific data that is configured by the application and which is shipped to the user database 12/24. This data is utilized by the system server 22 when generating search results once the search results are received from the remote search engines. The combination of the user data and the search results will offer the user more intuitive results, rather than the search results that do not utilize personal user-specific data. A fewer or greater number of fields and/or information can be specified in the user-database tables.

In another embodiment of the application the results of a search query from the user are ordered and sub-ordered so that they are more intuitively displayed. The examples below serve to depict a particular implementation of the application. The overall functionality can be utilized for other search terms using the same algorithm as disclosed below without deviating from the scope of the application. It may be possible for the application to determine the user's search results by categorically ascertaining the type of search being performed (e.g., topic and/or sub-topics) for many of the search terms, however, there will be search terms that the application is unable to categorize. For example, if the user is typing a person's name, an eating establishment, an artist, or some other popular search term, it may be easy to determine what category is being searched. If, on the other hand, the user is typing an ambiguous search term, it is difficult to ascertain the category. For example, if the user searches for "Halloween", this is a term that proves difficult to categorize. For instance, the user may be searching for information on the U.S. holiday, Halloween costumes, the original horror movie and/or even party ideas. Therefore, it is beneficial for the application to utilize other sources of information to narrow the search results. One way to perform this additional search query operation is to utilize popular search engines, information sources, and the like and returning to the user the results of what other users have selected when searching for the same term. This operation allows the application of the application to return intuitive results without having to guess what to provide for the results.

In one example, when the user of the application enters via a keyboard entry, spoken word, gesture, body movement, engaging a URL or link, or any other input method etc., a search term, the application attempts to determine what the top ranked actions are related to that term. For example, the application determines what other users have selected when searching for that exact search term. This information may be aged, accessed in real-time, or in near real-time or a combination of the above. This data is received or accessed from any source, such as popular search engines, information sources, and the like. This operation can occur at any time during the process but preferably occurs at or near the outset of the search term input. There are a plurality of topic areas that the user can be searching. By returning the top results based on the same, similar or related search terms, the appropriate search results can be provided that are more intuitive than regular search results.

There are a number of phases in processing the search query originally submitted by the user. The user search input may be one operation that triggers a plurality of other operations. For example, the results of a search are displayed to reflect the most popular or top results when searching for a same or similar search query. The next phase may occur when the user device submits a selection based on one of the selections received in the first phase. The application may perform a second or supplemental search based on the selection from the user and/or based on the previous actions of the user. After having determined the area of the search, the application can use this information to determine past actions from the user regarding the area. For example, if the item is a product (e.g., topic=product), then the application will be able to ascertain where similar products were purchased by utilizing sub-topics from pre-stored information associated with the user's profile.

In another embodiment, the application does not need to perform a search and can infer the area of the search based on the user's or other users' past actions. Thus the user's most probable action or next action can be presented and/or performed. The results are then displayed according to what actions the user has performed in the past. In addition to displaying the results according to the previously selected actions of the user, the application can select other responses based on further criteria. Understanding the importance of returning subject result areas that the user may be interested, although not having selected them in the past, a result will appear if the application ascertains that the user may be interested in that selection possibly because of a lower price, an establishment that is closer to the user device geographically, a product that is available faster via shipping or immediately downloaded, better retailer reviews regarding customer service, shipping, etc., all of which may be directly related to the user account. In a next phase of the query and search procedure, the application may permit the user to complete a transaction by permitting the purchase of a product or service, or performing another type of action, such as making a reservation, etc.

When using a search application/engine, information related to the results that the user selected when the search results are displayed are recorded by the application and/or provided to the application. In one example embodiment, web search companies gather analytics in many various ways thus making it possible to determine what users have clicked/selected when using their website to perform search. As an example, the analytics that GOGGLE utilizes may enable information to be gathered about user selection operations by utilizing an advanced search reporting (ASR) tool. When advanced search reporting is enabled, one can export the advanced search report. Each entry in an advanced search report represents a single user click/selection or other action, such as page load, in the search appliance user interface.

An entry is composed of comma-separated values. The following table 600 of FIG. 6 illustrates each value in an advanced search report. Referring to FIG. 6, the click time 612 provides a time of the click in 100ths of a second since a predetermine start date, yielding a sample value of 125001323979. The IP address 614 is the IP address of the user who performed the selection, for example, 172.18.75.121. The session ID 616 is holding a place for the session ID, which is usually blank. The click type 618 is the type of action, which can be a user click or other action. A click start 620 provides details of the results page of the user click, where 0=1st page of results. The click rank 622 is the rank of the result on the page of the user click, where 1=the 1st result, 2=2nd result, and so on.

A smaller number click rank indicates higher user click satisfaction. For example, the click data 624 is a usually blank field and the query 626 is a search query that returned certain results. The URL 628 is the URL of the user click.

Understanding the selections performed by other users may provide an alternative when searching for the same search term, which enables the return of the most commonly selected results. This result set will be returned in the first phase of the searching application results to enable subsequent search operations. The system server 22 of the application interacts with one or more search engines and/or with other data sources, such as lists, databases, blogging or micro-blogging sites to obtain the clicks or other actions, such as actions performed after an initial click, a forwarding of information, etc. of other users when searching for the same or similar search terms as the user of the application. This interaction can occur via an application program interface (API) of popular search engines that regularly publish interfaces providing application programmers the ability to query the internal data of search queries. The communication between the system server 22 and the remote search engines occurs through the network 16.

Figure 7:
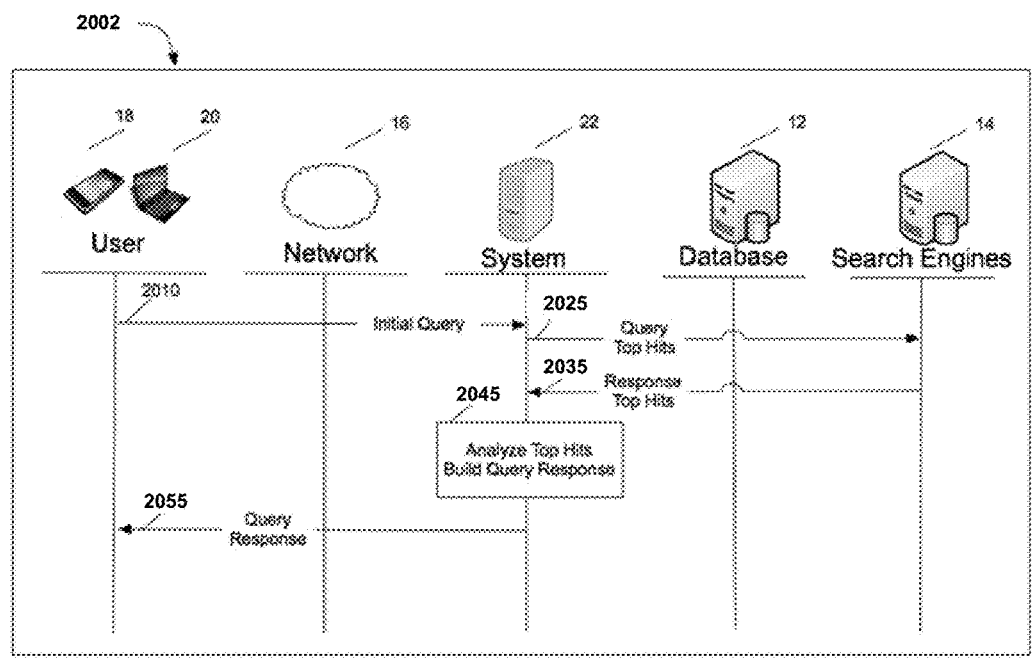
FIG. 7 illustrates a message flow of an initial query according to an example embodiment of the present application.

FIG. 7 illustrates a message flow processing procedure of an initial query. Referring to FIG. 7, the message flow of the initial query of the user is depicted 2002. The user enters the search term into the application 2010 similar to FIG. 2. This query is sent to the system server 22 routed through the network 16. The system server, upon reception of the initial query interacts 2025 with one or more search engines through published APIs. The system server 22 sends a message such as a query message 2025 to the search engine(s) 14 of to obtain the top hits for the given search term. The search engines returns the response(s) having the top hits 2035 to the system server 22. The system server 22 analyzes the results 2045 from the search engine(s) 14 and builds a response to the initial query and sends the response 2055 to the application.

In this phase, the user of the application submits a search term, and the application returns a colored grid depicting the results. There are numerous other ways this information can be depicted. For example, certain results can be highlighted, certain "boxes" can be shaded, certain sounds can be emitted, etc. The results are formulated by analyzing what other users have selected from a history record when searching for the same or similar search terms. By depicting the results as a colored grid, the user is able to easily determine the ranking of the results.

In an example of a colored grid, a green quadrant of a grid represents the most popular results of what other users have selected when searching for the same or a similar search term. The yellow quadrant represents popular selections from other users, but not the most popular. The red quadrant represents the least popular selections that other users have chosen.

Figure 8:
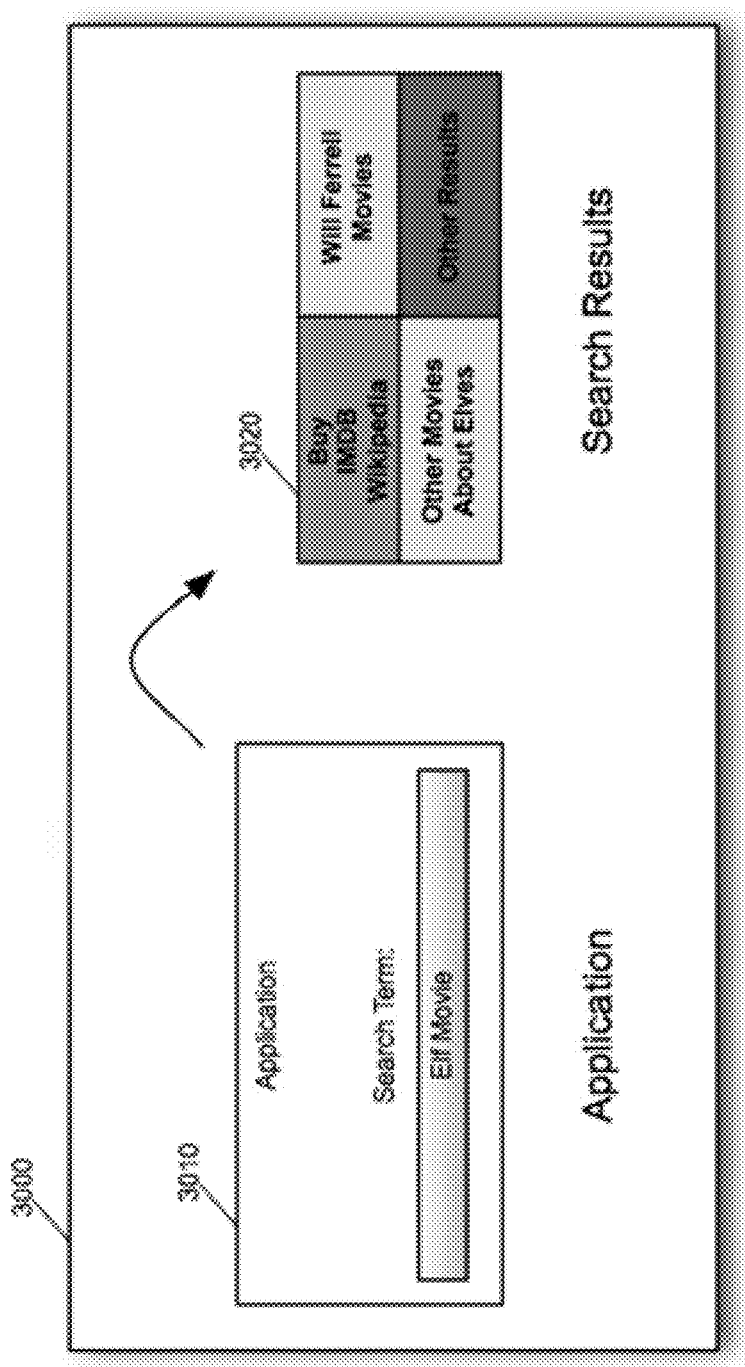
FIG. 8 illustrates an initial phase user interface search result according to an example embodiment of the present application.

FIG. 8 illustrates a graphical depiction 3000 of a search term entered into the application 3010 with corresponding search results 3020. In this example, the term "Elf Movie" was entered and the top results are depicted in each quadrant or portion of the search results 3020. The original term "Elf Movie" is received by the system 22 as an initial query message. The system references the user-database 12/24, the search engine database 14, and/or normal Internet searching databases in an attempt to obtain the most relevant results. These results are not those typically received from normal search criteria when the user is searching through normal Internet searching. Instead, the system 22 attempts to obtain results that are more specific to the user's interests. The user-database 12/24 is queried to determine any references related to "Movies". Access to this data may help determine user-specific data, such as the genres of movies the user is interested in, normal purchasing operations performed by the user, preferred type(s) of media, favorite actors/actresses, and any other historical data the user interacted with during movie related searches. In searching the search engines database 14, the most popular search results are obtained from other people making similar search requests. This may help in determining results that may be of more interest to the user.

The searching of the normal Internet related searching database through the use of application programming interfaces (APIs) will return results from the Internet databases in a similar fashion as the user simply entering the search in a search webpage on the Internet. These results are all utilized to obtain a list of search results that are more specific to the user. The system 22 obtains the search results from the internal and external databases and stores them locally in a local database. The top or most relevant results are selected so those more relevant results are most closely matching the original search term by using procedures such as token mapping of the search term. The user's own historical data may be provided more weight (i.e., two times the weight) to the search results as those results are more closely matching the user's likes and preferences. The top results (i.e., top four results) are returned back to the application for display to the user's device. Although depicted as a rectangle with four quadrants, the search results can take any shape or form and include any number of quadrants or areas. Further, although depicted to the right of the application 3010, the search results can appear in any area of the graphical depiction interface 3000, even within the application "box" 3010. This graphical depiction 3000 can appear on any type of device by utilizing a processor and/or memory. The user enters the search term in the application 3010 and selects a "button" (not depicted) to submit or send the information. The application sends the search term to the system 22 through the network 16. The system 22 obtains the dataset containing the clicks or other actions of other users when searching for the exact or similar search term on at least one search engine.

The system server 22 determines that the top clicks of other users fall into various areas such as, 'Purchase the movie' "Elf" in some media format. The Internet movie database (IMDB) entry for the movie "Elf", the online encyclopedia Wikipedia containing the entry of the movie "Elf", etc. These results are grouped together in the first-quadrant 3020 colored green. Though not depicted as such (i.e., not underlined), these entries are links that are clickable by the user of the application. In other embodiments, the entries can be audio, video, photos, text and the like. By shading the quadrant green, the user can easily determine the most popular results by a color coded scheme that identifies the most popular results into color categories.

Further analyzing the selections of other users, the system server 22 determines as an example that users have selected links regarding the main actor of "Elf", 'Will Ferrell' in previous searches related to similar search terms and content. As a result, the system server provides a link that permits the user to find information about movies with 'Will Ferrell'. While this search result is not reflecting the exact result of the user's initial search term, results are provided in the second-quadrant and shaded yellow. Such information may be helpful to the user, however by shading the box yellow, the application is communicating that this result is a "secondary" result.

Further analyzing the selections of other users previously logged, the system server 22 determines that users searching for the term "Elf Movie" had an interest in movies containing 'elves'. Therefore, the system server 22 provides another quadrant shaded yellow (another secondary result) and labels it "Other Movies About Elves" (see 3020). This other result is not exactly or similar to what the user was searching for originally, but the user may nevertheless find this result interesting. Finally, there is another quadrant provided from the search results that is shaded red that returns 'other results' of what other users have intermittently selected when searching for the same or a similar search term. This graphical interpretation of the search results brings an improved interface when searching the Internet. For example, the data of what other users have previously selected is provided from a single or multiple search engines and/or from other sources to bring the results from a plurality of users previous search efforts into a single search effort for optimized results and performance. In another example embodiment, the quadrants of FIG. 8 that are shaded yellow are further shaded to reflect the popularity of the results. For example, the results that were more popular are shaded a brighter yellow, and the results that were less popular are shaded a darker yellow.

For example, for a particular search query, search results are as follows, Choice 1—chosen by 1200 other users, Choice 2—chosen by 800 other users, Choice 3—chosen by 750 other users, Choice 4—chosen by 200 other users. In this example corresponding to FIG. 8, choice 1 results are shaded green, choice 2 results are shaded bright yellow, choice 3 search results are shaded a darker yellow or another color, and choice 4 is shaded red. In another embodiment, the user at the configuration of the application customizes the percentages of the results. For example, if the result is selected by greater than 90% of users, then the result is colored green, if the result is selected between 90% and 60% of users, the result is colored bright yellow, if the result is selected between 59% and 30% of users, the result color is dark yellow, and if the result is selected by less than 29% of users the color is red.

In another example embodiment, other elements are included when the system server 22 determines the search results. For example, the user's geographical location, the sex of the user, the user's previous activity types, the user's interests, the user's hobbies, and any other characteristic that may provide a determining factor in determining an intuitive response based on both recent search input and known search criteria of the user and other users previously logged. For example, if the user is querying running shoes, the application may determine that the main choice by other users is the ASICS brand of running shoes, however, because the sex of the user is female, the system determines that the search result with the highest rating should be REEBOK because that parameter just happened to be more popular among female users in general. As another example, the most popular search result may be the ASICS brand of running shoes, but the system server 22 determines that the user's geography is more likely to find results for the ADIDAS brand of running shoes, therefore the ADIDAS brand is returned as having a higher ranking.

The system interfaces with the user-database 12/24 of the user and other users of the application to determine this functionality. In a second or subsequent query processing phase of the application, the past actions of the user are taken into account for processing current actions. These past actions are stored in a history account or file and are retrieved and used to dictate responses of results when the user performs selections. In another embodiment, the application does not need to perform a search and can infer the area of the search based on the user's or other users' past actions. Thus the user's most probable action or next action can be presented and/or performed.

In order to understand what actions a particular user has performed, the application creates a record of certain interactions of the user and stores them in a database henceforth referred to as the historical database 15. The historical database 15 (see FIG. 9) can be implemented in the user's device 18/20, in the system server 22, or in the database 12/24 remotely associated with the system server 22 depending on the particular implementation. The significant difference of where the historical database is located pertains to the interactions with the historical database 15. If the historical database 15 were stored on the user's mobile device 18/20, then other devices that the user may utilize, such as a desktop or laptop would not have access to the historical database, and therefore would not have access to the previous actions associated therewith.

It is assumed that the more proper location of the historical database is therefore in either the system server 22, or in the communicably coupled database 24 of the system server 22. For the purposes of this disclosure, the historical database 15 is located in the database 24, communicably coupled to the system server 22. Locating the historical database 15 in this central location would provide the benefit of permitting the user to have access to the historical database 15 regardless of the device used by the user to execute the application of the application. In other embodiments, the actions of the historical database 15 and/or the information contained therein can be performed and/or resident fully or partially on any other device described and/or depicted herein in the example drawings and examples.

Figure 9:
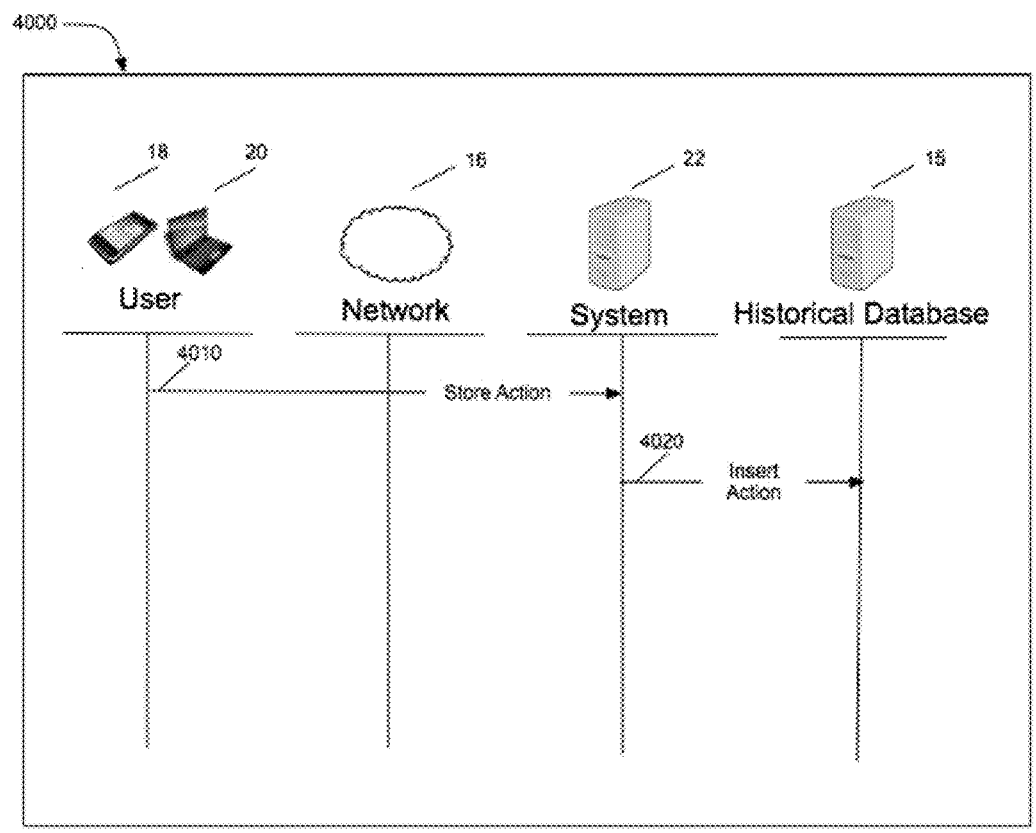
FIG. 9 illustrates a system diagram with an add action feature according to an example embodiment of the present application.

Referring to FIG. 9, the message flow 4000 depicts the application storing an action of the user into the historical database. In operation, the application is executing on the user's device 18/20. The application stores an action of the user in the historical database via a store action 4010. This message is sent to the system server 22, and routed through the network 16. The system server 22, upon receiving this message sends a message, such as an insert action message 4020 to the historical database located in the remote database 14. There is no return message as this action serves to insert the action into the historical database without any need for a response. The types of actions that are recorded in the historical database are those actions that pertain to the user's interactions with a data source, for example, the Internet, Intranet, database or other source. For example, items that may be stored in the historical database may include the locations where the user regularly purchases products and the types of products, regular websites that the user utilizes to obtain information from the Internet, etc.

To further depict an example of an action stored in the historical database 15, let us assume that the user has purchased a product from the online store AMAZON.com. The application, executing on the user's device 18/20 can monitor one of many different actions to determine the interaction with that particular website. For example, the application can monitor the user's emails and see that an email was received from that website that indicates that a product or server was purchased from the AMAZON website from the user.

In another example embodiment, the application can monitor the user's browser. The application, through the monitoring effort can determine that the user has navigated to the checkout on the AMAZON website and a product or server was purchased. Finally, the application sends a message, such as the "Store Action" message 4010 to the historical database that contains the following information, for example: Store Action Message, Time 12/02/2013 14:22:24, Website Amazon.com, Action Purchase, Product Area Electronics, Item Otterbox Ipad Case, Item Screenit Ipad Screen Protector (see FIG. 10). Referring to FIG. 10, the results of a store action message are provided in a table format 1090.

In a secondary phase of the search operation, the user's previous actions (as stored in the historical database 15) can be utilized. For instance, the user has been presented with a first search result in the form of a four-quadrant, colored component with selectable options in each of the four quadrants. In one example embodiment, the colors reflect the interest of the user based on the actions of other users. The user selects one or more of the links in the quadrant(s) and the application begins to process the selection(s). Instead of utilizing what other users have selected, the application queries the historical database 15 to obtain search results that reflect the previous actions of the same user.

FIG. 11 is a table of entries in the historical database according to example embodiments. Referring to FIG. 11, a depiction of a table 1100 in the historical database is provided. The elements in the table serve to illustrate an example of a possible implementation of the data structure inside the database. One versed in current database programming techniques will easily be able to implement other ways of storing the user data. In FIG. 11, the first entry provides that on Jan. 31, 2013 at 05:56:03 pm, the user purchased media from their ITUNES account. The second entry provides that on Feb. 1, 2013 at 9:03:23 am, the user purchased one or more electronic products from the online AMAZON website. The third entry illustrates that on Feb. 16, 2013 at 1:23:55 pm, the user made a restaurant reservation at a 'Texas Land and Cattle' location. Finally, the fourth entry provides that on Feb. 20, 2013 at 1:25:54 pm, the user made a purchase of office supplies from the online STAPLES.com website.

Figure 12:
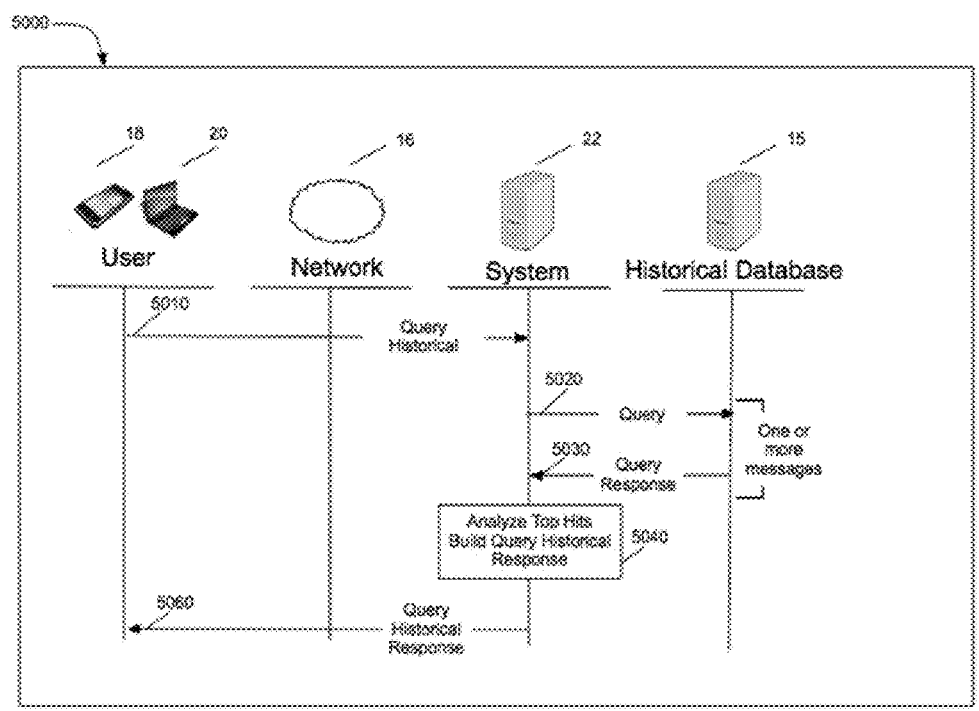
FIG. 12 illustrates a query operation of the historical database according to an example embodiment of the present application.

In FIG. 12, the message flow 1200 of the application querying the historical database is depicted 5000. In this scenario, the user has been presented with the initial search results that have been obtained by using other user's selections given the same or similar search term(s). The user has selected one of the links in the colored component on the GUI of the application. When the user selects this link, the application sends a message, such as a query historical message 5010 to the system server 22. This message is routed through the network 16. Upon reception of the message, such as a query historical message, the system 22 queries the historical database 15 by sending a message, such as a query message 5010. This database is remotely located to the system server 22. In other embodiments, the database 15 can be a part of the system server 22.

The historical database 15 returns the results in a message, such as a query response message 5030, which is sent to the system server 22. While the message, such as the query message 5020 and the corresponding message, such as the query response message 5030 are currently depicted as a single paired message, it is understood that there may be multiple queries and responses to obtain the historical data necessary for the application to understand the previous actions of the user that bear weight to ascertain the correct response. The system server 22 analyzes the result(s) from the historical database 5040 and returns a message, such as a query historical response message 5060 to the application executing on the user's device 18/20. The message, such as the query historical message 5010 contains details of the action selected by the user in the application. For example, assume that the user of the application chose the "Buy" link in the search results 3020. This action indicates that the user is trying to purchase a product related to the initial search query: "Elf Movie". In this example, the message, such as the 'query historical message' 5010 may contain the following elements, Query Historical Message, Time 12/02/2013 14:32:45, Action Purchase, Product Area Media, Category DVD.

The system server 22 receives this message and queries the historical database 15 in an attempt to determine the user's previous actions surrounding the Action=Buy. In this case, the application determines that the user desires to purchase the media in the form of a DVD by analyzing the message, such as the query historical message 5010. The system server 22 queries the historical database 15 to obtain previous actions performed by the user when purchasing an item. It attempts first to determine if there is a match of Action=Purchase with the product area (i.e., category): "Media". If there is a match, then the data from that element in the database is sent in response to the message, such as the query message 5010. This information informs the system server 22 that the user has previously purchased the same type of product, and the business entity where the previous purchase was made. The message, such as the query message 5020 can contain the same information as the message, such as the query historical message 5010), or the message, such as the query message 5020 can reformat the request into a message that is more relevant to the stored data in the historical database 15. Using the data in FIG. 11 and the table of 1300 of FIG. 13, the first entry in FIG. 11 would be a match and the response to the message, such as the query historical message would contain the data that the user previously purchased media from ITUNES. The system server 22 would then send back to the user of the application the link to purchase the media from their ITUNES account because that is where they previously purchased similar content in the past. The user is able to complete a transaction through the application by initiating a purchase or otherwise completing the request to finalize the transaction. The user may simply select on the "Buy" link, and will be navigated to the page that permits them to purchase the movie from their ITUNES account.

In another example embodiment, the transaction occurs automatically. The initiation of the transaction can be triggered by a timer that expires after a given action, after the user has a definable interaction with the GUI or by any other implemented functionality. In another embodiment of the application, functional implementations are available that offer other responses when the user selects a link in the colored quadrants component. The system server 22 responds with a choice where the user can select the next action. The application offers a colored, four-quadrant component similar to a first search phase offering the results from the query historical message 5010.

Figure 14:
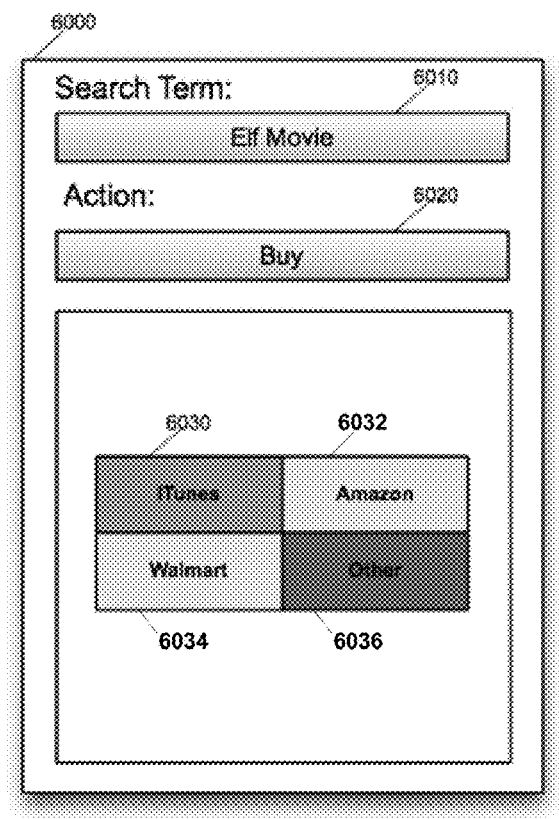
FIG. 14 illustrates a subsequent search phase user interface according to an example embodiment of the present application.

FIG. 14 illustrates a user interface 1400 that provides search results in category of significance according to example embodiments. Referring to FIG. 14, the application executing on a user's device 6000 may provide a user interface display with the following options. For example, the first query is displayed in the first area 6010 with the title "Search Term". The second selected item is illustrated in the second area 6020 with the title "Action". The third area 6030 contains a four-quadrant, and four-colored component containing the results from the query historical message 5010. In other embodiments, such areas can be combined into one or more areas. The search results 6030 are color-coded to reflect the user's interests according to the application's calculations and by using the user's previous actions. The top-left item 6030 may be color-coded green and may have a link entitled "ITunes". This is because the query to the historical database 14 found that there was an entry where similar media was purchased by the user's ITUNES account. Therefore, it is assumed that the user prefers that particular company in purchasing media. The top-right and bottom-left quadrants 6032 and 6034 may be color-coded yellow and contain the links "Amazon" and "Walmart" because while the query to the historical database 15 did not return these companies, it is aware many users utilize those companies to purchase media, for one or more of the following reasons: lower cost, larger number of user reviews, faster shipping availability, higher customer service, easier return policy, higher company rating among users, availability of immediate download, an establishment may be geographically closer to the user by understanding the location services in a user's mobile device. Finally, the lower-right quadrant 6036 may be color-coded red and contain a link that offers the user other locations that offer the media. The red color indicates to the user that the selection(s) therein are deemed to be not of a high interest to the user.

When selecting one of the links in the color-coded quadrants, the user is brought to the site and permitted to purchase the media or complete any other type of action. The use of color to represent the results permits the communication of preference to the user without adding text to the display components. The use of color permits the application to more wisely use the "real estate" of a display, but retain the intuitiveness of the results.

In another embodiment of the application, the system server 22 may calculate other results either before or after interfacing with the historical database 15. For example, the use of other actions the user has taken though not specifically with respect to the area of the search. When interfacing with the historical database 15, the application may determine that the user while querying for product=media usually uses Apple to download a movie and/or television show. This action does not reflect the current action category of "Buy", but nonetheless refers to the product at hand, Media. While the use of APPLE in the past may bear weight to the use of APPLE/ITUNES to purchase media, the result returns AMAZON as the main 'green' colored selection because it also determines that the user has used AMAZON's website to purchase products even though it is not the current product in the current scenario. AMAZON has media for sale as well at a lower price compared to APPLE so it becomes the highest priority selection in the search results for this particular search.

Figure 15:
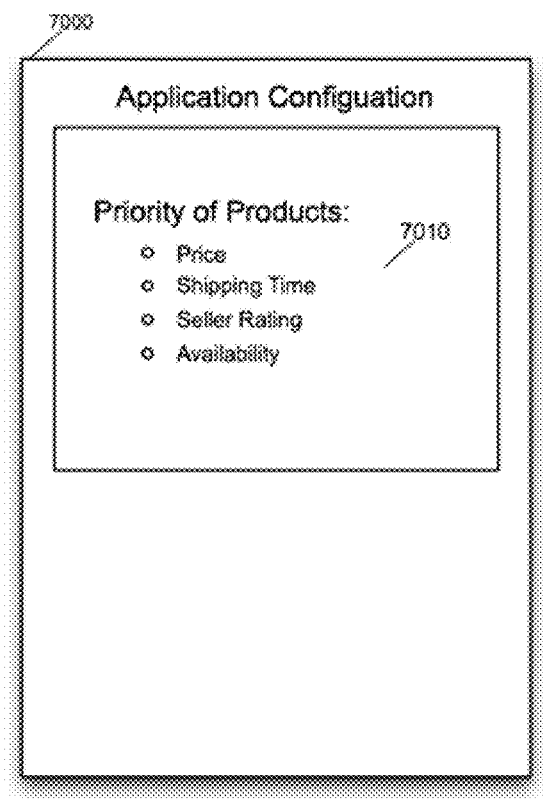
FIG. 15 illustrates an application configuration user interface according to an example embodiment of the present application.

In another embodiment of the application, the user has the ability to configure the application that will be utilized by the system server 22. The configuration options permit the system server to return search results that correctly reflect the user's requests. FIG. 15 illustrates an example 1500 of a configuration option interface 7000, which provides the user with an option to communicate his/her preferences in the search results. The configuration item "Priority of Products" 7010 component permits the user to select the item that is of highest priority when obtaining results from the system server 22. The options can be one or more of price, shipping time, seller rating, availability, or any other characteristic of business entities. The selected preferences, when configured in the application are communicated to the system server 22 to permit the application to return search results that reflect the user's requests. Other configuration options can be programmed into the application providing the application with the ability to identify the desires of the user when computing the search results. These other configuration options can be easily determined and implemented without deviating from the scope of the application. It is also noted that the configuration of the priority preference is an optional element of the application and any examples described herein can be a result of the priorities established in the setting of the priorities and/or from the prior searching history of the user in previous searches and/or other disclosed procedures in the current application. The establishment of the various user priorities can be performed prior to any search queries being executed and thus will provide search results that reflect the previously set priorities in addition to the new search terms received. In the scenario where the priorities are not set at the onset of the application initialization, once the priorities are established in the application, future search results will reflect the established priorities by incorporating them into recent search queries received.

When a user normally searches the Internet for a search term, it is normal to expect the results to be a list of links displayed inside the browser one after another in a tabular format. The first page of results tends to be the most popular results or most relevant, followed by many other pages of less popular results. On mobile devices, it is less useful to receive a list of links for the search results due to the lack of visual display real estate available on a minimal display of a smartphone or comparable device. It is therefore desirable to functionally redesign the search results to become more intuitive and compact to avoid having to click on multiple pages or page through many links of results.

In the examples described in this application, it should be noted that the display functionality utilized color and different display segments (i.e. quadrants) to intuitively reflect the interests that the result may have with the user. This result is based on what other users have selected when searching for the same term and also what previous actions that the user had performed when interacting with the same type of products involved in the search results. By utilizing color, the application is able to communicate possible interest without any additional text on the display, additionally, by utilizing colors that are widely accepted, the user is easily able to ascertain the value of interest that the application has assigned to a given result and to select the particular scope desired prior to further limiting the search results. As an example, the color 'green' translates to a result that is deemed to be highly useful to the user, 'yellow' would translate to a result that is useful, but may not be the same level of interest as a result colored green, and finally a result in a 'red' color would incorporate all of the "other" results, shown for thoroughness.

In keeping with the understanding that a mobile device is operating with a very limited display area, it is further desired to make search results with the ability to be more intuitive than results on a browser window on a larger display, for example a desktop or laptop computer. As detailed above, the results of the original search term are presented to the user as a four-quadrant, colored rectangle. The colors represent the different interests or sub-interests that the user would have in that particular result according to certain search criteria used by the application, such as what other users have selected when performing the same or a similar search, and previous actions of the user when navigating through the Internet. When a search is performed in the application, as before, the four-quadrant box may be displayed with topic results indicating different results or sets of results corresponding to other queries or other results within that particular topic area. The further functionality begins when the user "touches" or "selects" one of the results of the search results menu by selecting any of the four-quadrants. This selection operation can be with a pointing device, a finger on the touch display, a stylus pointing device, a mouse icon in the case of a computer utilizing a mouse-pointing device, etc.

When the user "touches" or "selects" one of the words in the search results, the application performs functionality that queries the system 22 to obtain the further results reflecting that search term being selected by clicking the search result word. These further results are displayed on the screen as other boxes that are tiled in a backwards order from the original box. The further boxes are presented to represent the user having clicked on the same quadrant as the initial selected quadrant.

Further functionality may permit the user to traverse the multiple boxes presented. Also, additional functionality may be presented that permits the user to change the results of a specific box. For example, if the user selects a quadrant in a box, the application redraws the boxes below reflecting the newly selected choice. This functionality permits the user to traverse search results at a greater and more intuitive manner than the traditional search results. To further describe this example, graphical depictions of the flow of the search are described with reference to the example user interfaces.

Figure 16:
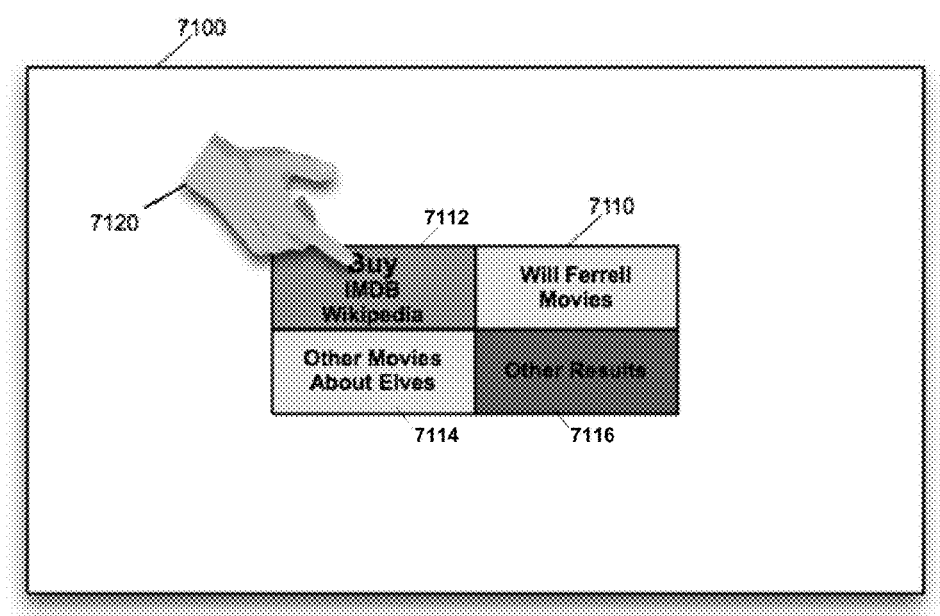
FIG. 16 illustrates search results user interface according to an example embodiment of the present application.

FIG. 16 illustrates a user interface depiction of a set of search results according to example embodiments. Referring to FIG. 16, user interface 1600 includes an original set of search results which are depicted in a four-quadrant configuration 7100. Following the same example for a user input of "Elf movie" or related search terms, the quadrants include different particular results which may be shaded in different colors that reflect the proposed interest of the user. The user in this example has pressed his finger 7120 or other selecting device over the "Buy" link 7112 in the green quadrant. This permits the application to send the query historical message (see FIG. 12) to query the previous actions of the user. This message is the same message that would be sent to the system server 22 had the user actually pressed the link and let go. In this case, because the user has not removed the pointing device, the application may respond by displaying the search results in a stacked manner behind the original four-quadrant box (not shown in this example). The other quadrant 7110 provides a link to Will Ferrell movies, 7114 is for other movies about elves and 7116 is other results in general, which may be colored yellow or red for decreasing relevance unlike the more popular green result of 7112. Color coding may be based on the relevance and previous history of relevance information stored in a database.

Figure 17:
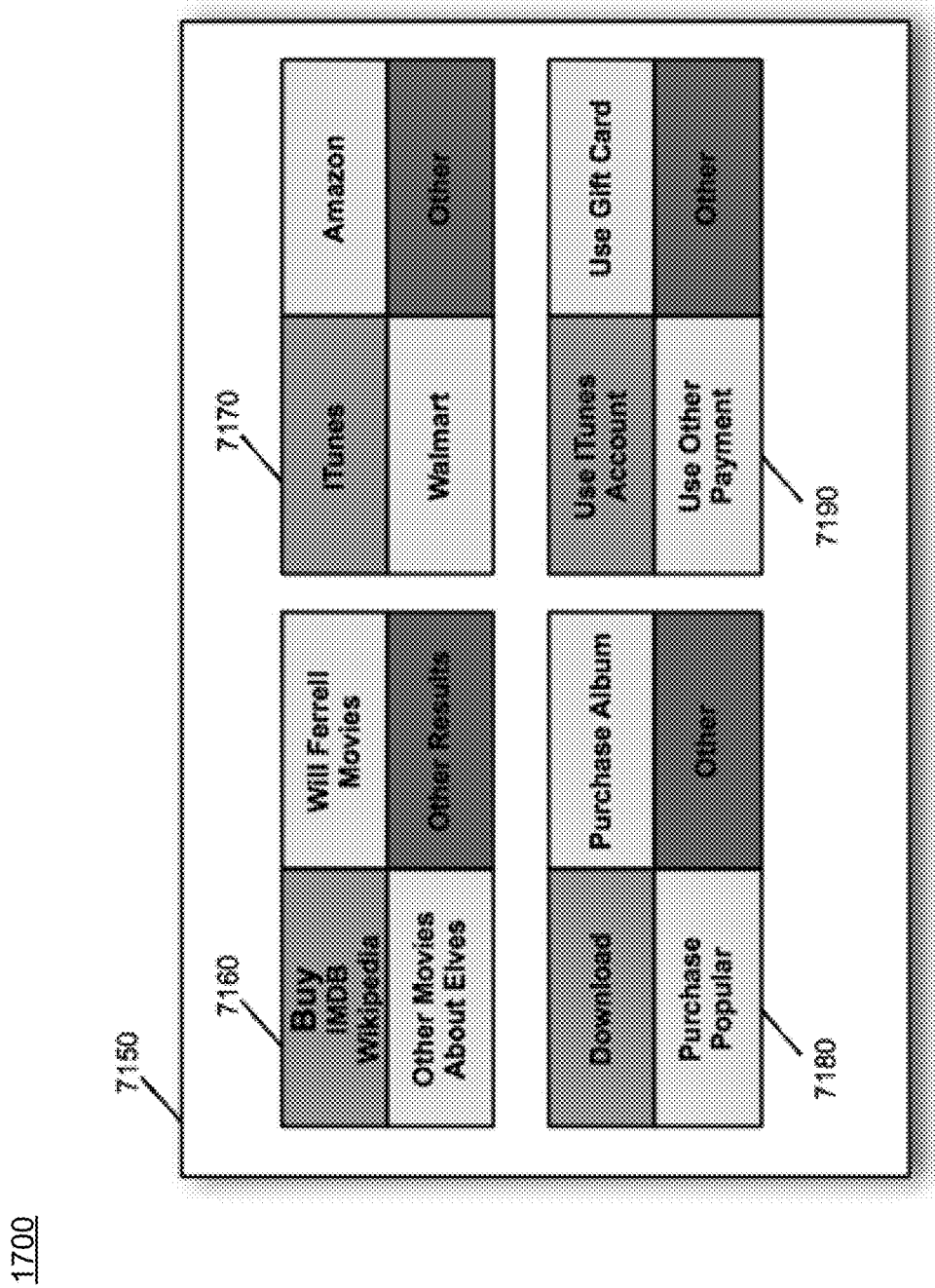
FIG. 17 illustrates a search results box user interface according to an example embodiment of the present application.

FIG. 17 illustrates a set of four quadrants as search results according to example embodiments. Referring to FIG. 17, the user display 1700 includes a set of four quadrants 7150. The four search result boxes in 7150 are displayed when the user selects the "Buy" link in the first search result box 7160. In other words, the initial quadrant 7160 may invoke the other three sets of quadrants 7170, 7180 and 7190. When the user moves the pointing device over the "Buy" link of 7160 and the pointing remains over the link, the application enters into State-B or an alternative state and the query historical message 5010 of FIG. 12 is sent to the system server 22. The system server 22 then responds back with the query historical response message 5060. The three other search result boxes 7170, 7180, and 7190 are then created, stacked on top of one another or side-by-side as in this example of FIG. 17.

In this example, since the user has selected to purchase a product, the application determines that the user normally utilizes ITUNES to purchase similar media so it returns the ITUNES link from the history database in a top left green quadrant 7170. The application also determines that AMAZON and WALMART sell these products and that the user has purchased similar media from those sites/locations as well and then those results may be returned in yellow quadrants under the quadrant set 7170. The last 'red' quadrant is included with the "Other" link for purposes of giving the user other options to research although less likely to be selected.

In the third quadrant set 7180, results are presented that assume that the user has selected "ITUNES" from 7170, and is thus 7180 is a spin-off or dependent quadrant set that originated from a selection of the second quadrant set 7170 because the original link selected in the first search results box 7160 was from the same quadrant set. The link entitled "Download" from quadrant set 7180 refers to the products being downloaded from ITUNES. This would be due to the system server determining that this result is the most popular action of the user in the past, which is based on historical data. Alternative actions for additional search are presented in the yellow quadrants. Finally, the red quadrants list 'other' options and are included for other non-specified actions. The alternative sales sites, such as WALMART and AMAZON may be based on promotions or paid advertisers who are linked to the sales of content as provided in this example and paid advertisers may have their own color, such as purple or stripes to identify that it is a promoted link and is not a normal result of the search application.

Finally, the fourth quadrant set 7190 includes those actions related to the user buying the media from ITUNES and selecting the download option. This quadrant set displays the types of payment that are available for the user to purchase the product. The system server 22 may discover that in previous purchases, the user has selected the ITUNES account so it is reflected in the top left quadrant, colored 'green' for its foremost popularity and history. Other options are available to the user and may be colored yellow for less popularity. Finally, the bottom quadrant may be colored red as 'other' less popular options and may be included for other non-specified actions.

Figure 18A:
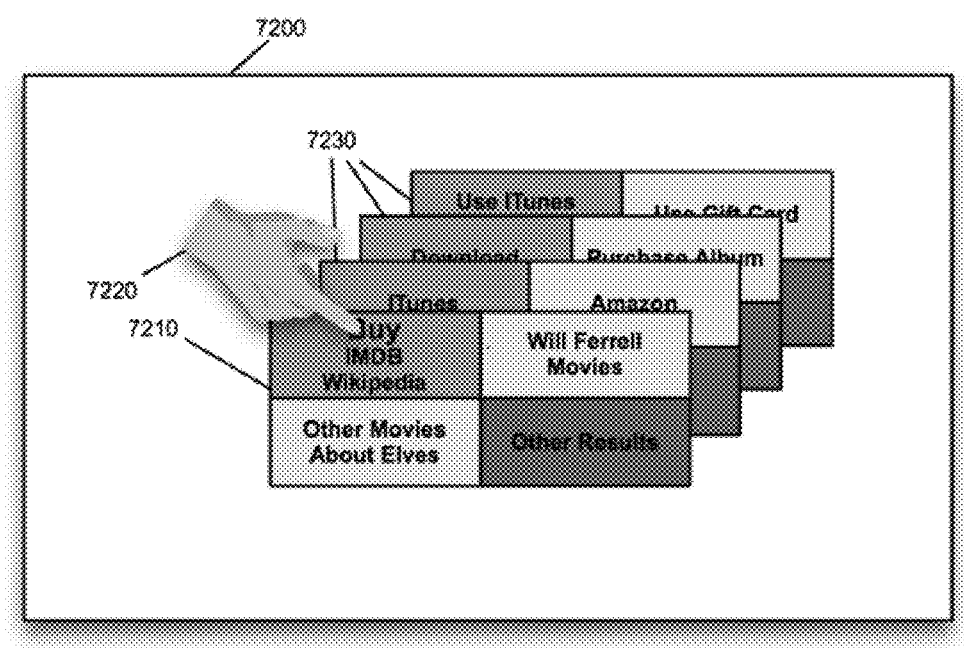
FIG. 18A illustrates a user interface with a stacked menu configuration according to an example embodiment of the present application.

FIG. 18A illustrates the search results 7200 with subsequent search results 7230 stacked backwards from the original search results box depicted as a stacked menu 7210 according to example embodiments. In this example, the user interface may display the original search results 7210 and a pointing device 7220 moved over the "Buy" link in the top left quadrant 7210 may invoke the stacked menus 7230 behind the first quadrant. As the user moves over the "Buy" link of quadrant set 7210, the application sends the same query historical message to the system server 22. Consequently, the display is updated with the results of the query historical message 5010. This message received from the application is the query historical response message. These additional search results and quadrant sets are noted in the boxes 7230 displayed behind the original search results box quadrant set 7210.

The subsequent quadrant sets 7230 are displayed reflecting the user having selected the same quadrant as the original selection. For example, since the user selects the "Buy" link in the left upper quadrant of 7210, the subsequent boxes 7230 reflect the user having selected the same quadrant in each of the subsequent boxes. If the user selected "Will Ferrell Movies" 7210, the subsequent boxes 7230 would have reflected the same quadrant selections as the upper right portions of the quadrant.

The particular action that permits this functionality to work is the user not raising the pointing device once a link has been touched by the pointing device. If the user selects a link with a pointing device, then lifts the pointing device, this functionality will provide initiating another query historical message, which in turn, initiates processing that may result in the application to wait until the query historical response message is received by the system server 22. In these examples, there is an icon displayed on the screen that offers feedback to the user that processing is occurring. This icon can be a spinning clock, an hourglass, or any other icon regularly utilized in similar circumstances.

In displaying the search results boxes, specifically when stacking the boxes of quadrant sets on top of each other, programming of the application permits the coordinates of the entire specific boxes to respond to activation of a pointing device. Additional functionality is incorporated that permits the user to select other selections within any of the boxes, which alters the contents of the boxes or quadrant sets below the current results box or quadrant set. While the pointing device is depressed in the touch screen of the device, this functionality permits the user to move the pointing device around the screen and consequently the boxes containing the various query responses to view and/or change the responses of the lower results boxes. This is programmatically performed by altering the state of the application to a different state 'State-B' which provides that movement of the pointing device performs different actions that bring the box being "touched" by the pointing device to the front of the display. Therefore, when in State-B, the movement of the pointing device around the display causes the application to call operations that perform specific actions. If the pointing device moves over a search results quadrant set below the topmost quadrant set, the operation called will then bring that quadrant set to the front of the display by rotating the order of the stacked quadrant sets.

Figure 18B:
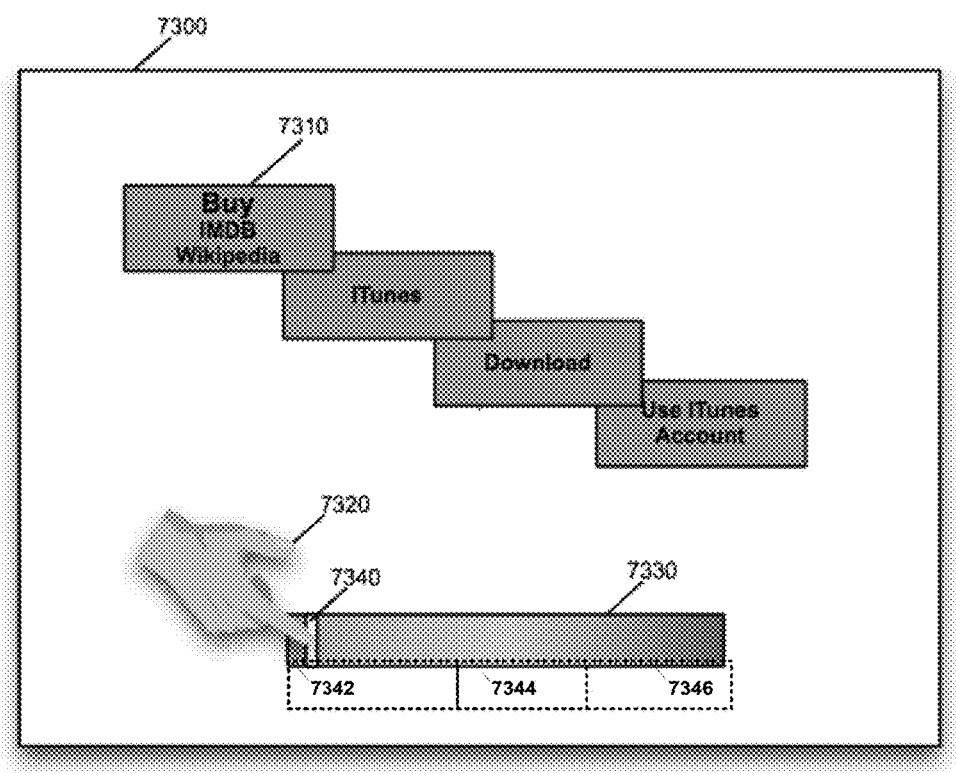
FIG. 18B illustrates a user interface with a selection capability according to an example embodiment of the present application.

FIG. 18B illustrates the selection capability 1850 of the scroll bar user interface 7300 according to example embodiments. In this example, the user selection tool 7320 has selected the 'green' portion 7342 of the selection capability position indicator 7340 among the colored portions of the faded color bar 7330, which includes 'green' 7342, 'yellow' 7344 and 'red' 7346. The indicator 7340 is a position that indicates the selected portion of the selection capability bar 7330. The application responds with displaying the complete results 7310 relating to the search results in the green quadrant. In this case, the search results relating to the green quadrant of the first search results box provides all 'green' or popular results including 'Buy IMDB Wikipedia', 'ITUNES', 'Download' and 'Use ITUNES account'. The first link, "Buy" 7310 is selected by default by the application, and the subsequent search results are layered below the first box 7310. These subsequent boxes reflect the user having selected the first link in the first search result box, "Buy". If the user desires another link in the first search result box, the user must move the input mechanism(s) over the desired link. For example if the user wishes to select "IMDB" in the first search results box, the input mechanism(s) is/are moved over that link and selected. The subsequent boxes are then updated with the results of the "IMDB" selection. The link chosen would be boldfaced in this scenario.

Figure 19A:
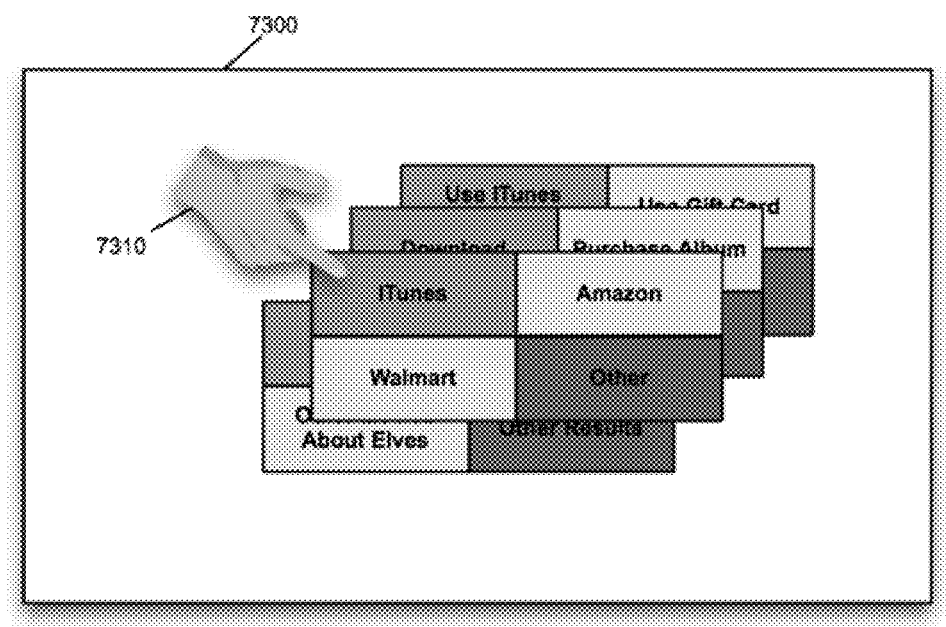
FIG. 19A illustrates a user interface with a lower results box selection capability according to an example embodiment of the present application.

FIG. 19A illustrates a user interface 1900 depiction of the user selecting a lower results box according to example embodiments. In FIG. 19, a graphical depiction of the application with a stacked menu is provided 7350 with the user 7360 selecting the second quadrant set box of search results. This examples assumes that the application is in 'State-B' initiated by a press and hold operation. This action brings the second quadrant set box to the forefront of the display and permits the user to interact with that search particular results quadrant set while the others remain in the background. The user may traverse through each of the search results boxes, bringing them to the forefront, as they are touched with the pointing device 7360. Since each of the search result boxes of the different quadrant sets corresponds with a specific action, the user may desire to alter the search results boxes to reflect selections other than the default choices. In this case, the user only uses the pointing device 7360 over the desired link in the search result box.

Figure 19B:
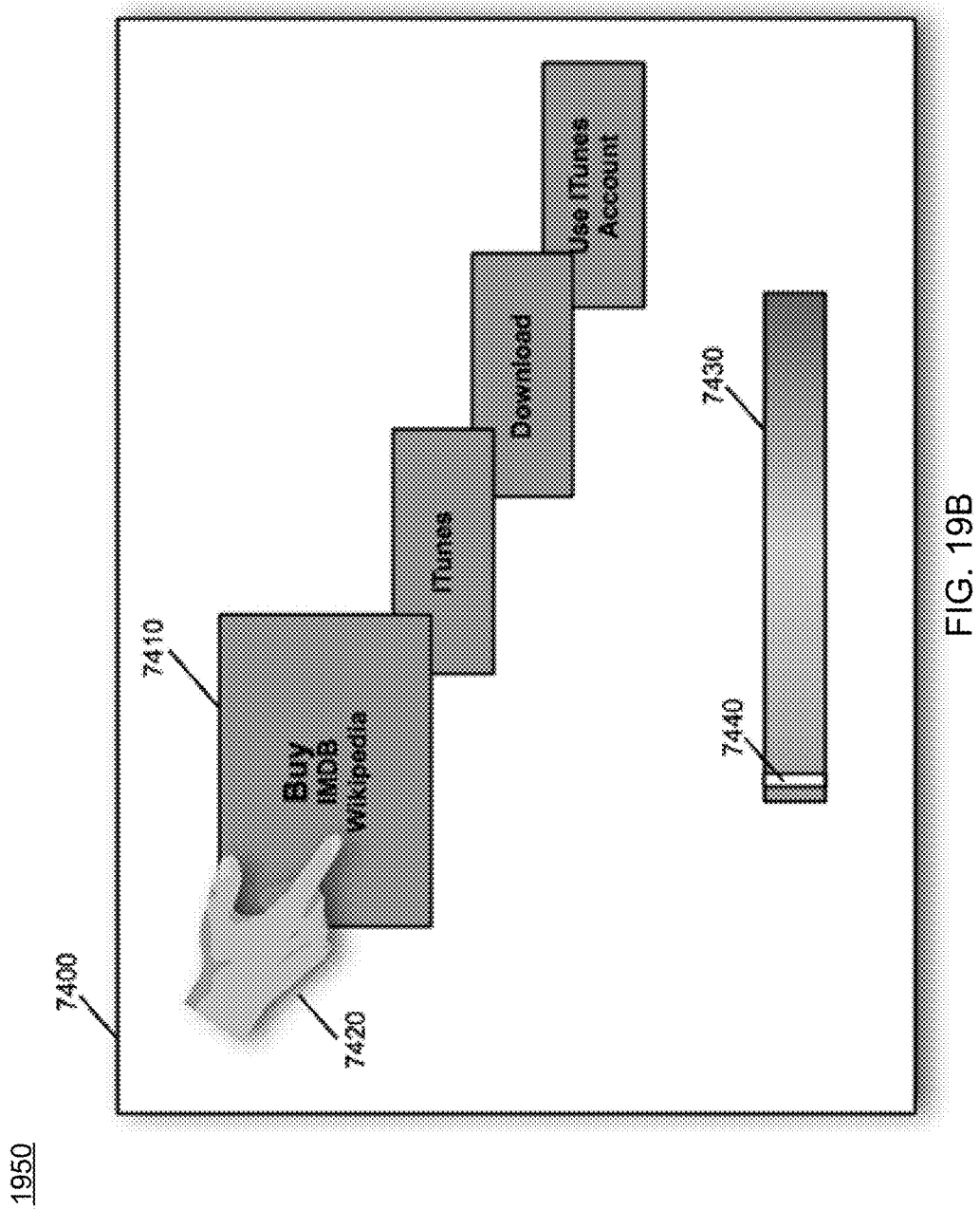
FIG. 19B illustrates a user interface with a box selection capability according to an example embodiment of the present application.

FIG. 19B is a user interface depiction of selecting an active box. For example, FIG. 19B illustrates the user selecting an active box active 7400. By moving the input mechanism(s) 7420 over the first box 7410 of the group, the application provides feedback to the user that the box is "active" by enlarging the box 7410. The selection capability 7430 at the bottom is displayed to allow the user to select other search results by sliding the selection indicator 7440 across the color coded results bar 7430. By making a box active, the application state is altered to cause a different feedback to occur when the input mechanism(s) 7420 is/are moved. For example, when a box is active, if the user were to move the input position indicator mechanism(s) 7440 over the selection capability bar 7430, the application would alter the results of the active box. If the active box is altered, then the application responds with sending the query historical message to query the previous actions of the user or other users. When the query historical response message is received in response, the application displays the different results in the boxes below the currently active box.

Figure 20A:
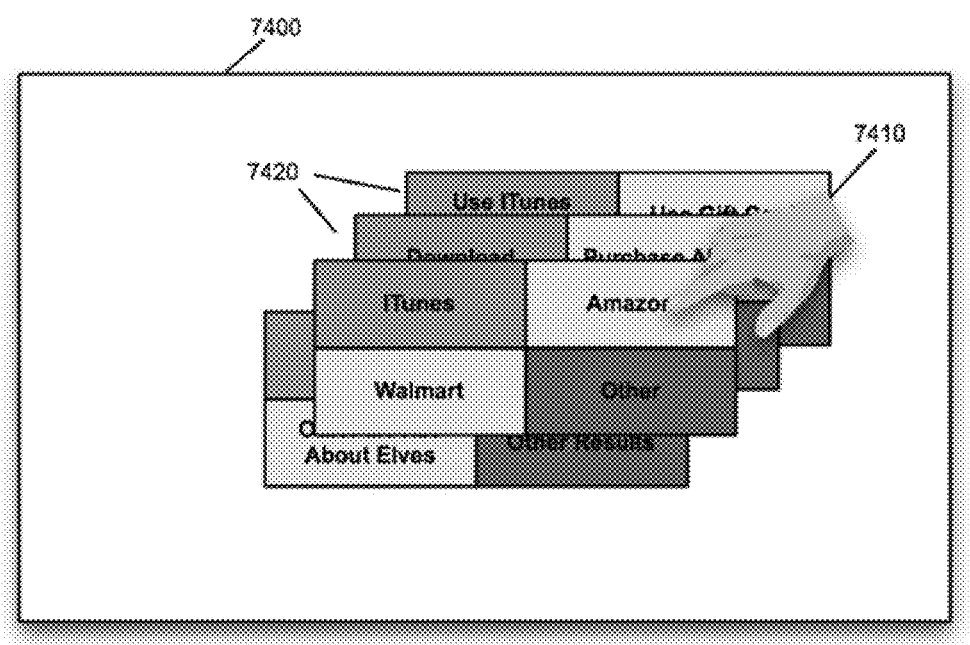
FIG. 20A illustrates a user interface with a link selection capability according to an example embodiment of the present application.

FIG. 20A illustrates a user interface 2000 depiction of the user selecting another link. FIG. 20A illustrates a user selecting a link 7410 in a stacked menu that is in a different quadrant than initially selected 7420. The user initially selected a link in the top left 'green' portion of the first search results box over the link entitled "Buy" via the selection tool 7410. The user did not remove the pointing device 7410 thus moving the application into State-B. The application responded with search result boxes tiled below the first search results box in a set arrangement 7410. The user then moved the pointing device to the second search results box, bringing it to the front of the display. The user then moved the pointing device to the right top quadrant, over the "AMAZON" link via the point device 7410. This action would occur if the user desired to purchase the product, but selected not to use the ITUNES account, but rather to use AMAZON for the purchase. When the user moved the pointing device 7410 over the AMAZON link, the two lower boxes of the set of quadrants 7420 are updated with the results from the query historical response message. In subsequent executions of the application, the "AMAZON" quadrant may be reflected as the top-right quadrant and be colored 'green' if the system server 22 determines that the user has selected this option more than the ITUNES option when querying the user's historical database 15.

Figure 20B:
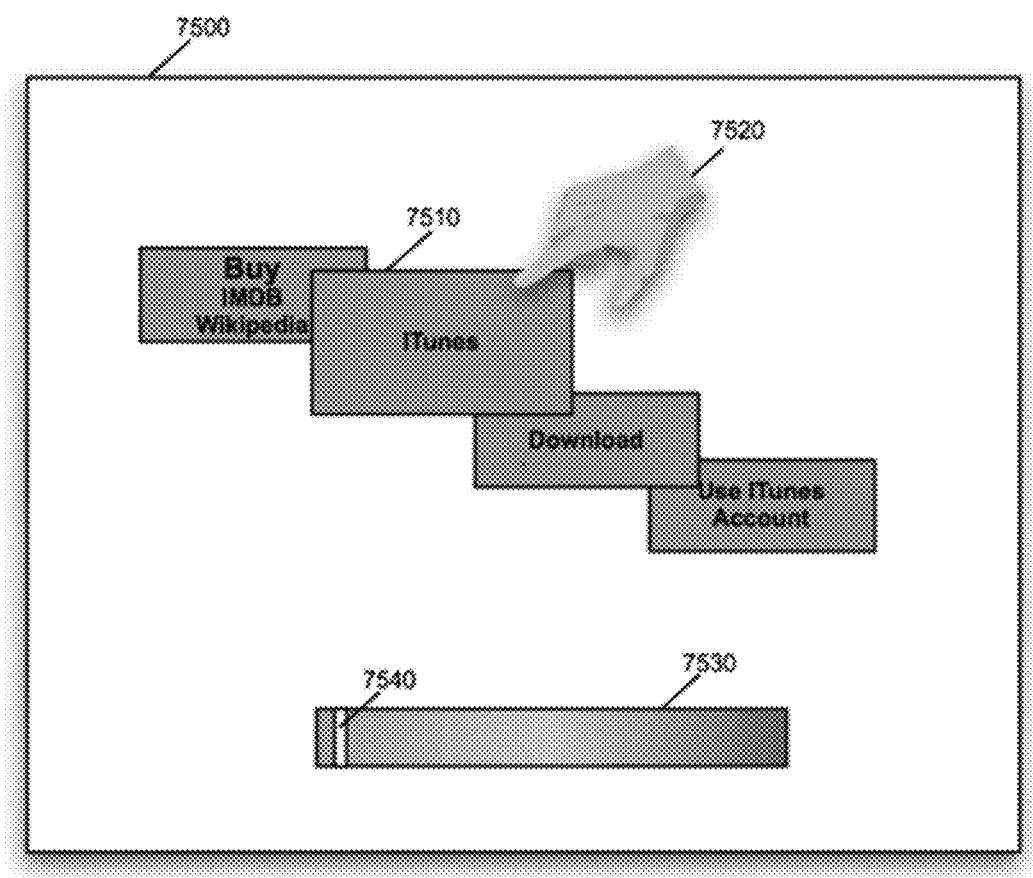
FIG. 20B illustrates a user interface with an alternative active box selection capability according to an example embodiment of the present application.

FIG. 20B is a user interface depiction 2050 of selecting an alternate active box with the slider selection tool according to example embodiments. Referring to FIG. 20B, the user is selecting another active box in the arrangement 7500. The input mechanism(s) 7520 has moved over the second search results box 7510 'ITUNES'. This causes the application to move the second search results box to active state and thus enlarges the box. By moving the box into active state, the user is able to alter the search results of this particular box by moving the input mechanism(s) to the selection capability bar 7530. The application applies the change to the selection capability bar 7530 to the active box 7510 by sliding the position indicator 7540 accordingly. In this scenario, the user may desire to buy the product, but may not want to use ITUNES for the purchase. By making the ITUNES box active and using the selection capability selection indicator 7540, the changes are applied to the active search box 7510 accordingly. When the active box changes due to the user having moved the selection capability, the application responds by transmitting the query historical message to query the previous actions of the user. When the query historical response message is received in response, the application displays the different results in the boxes below the currently active box.

Figure 21A:
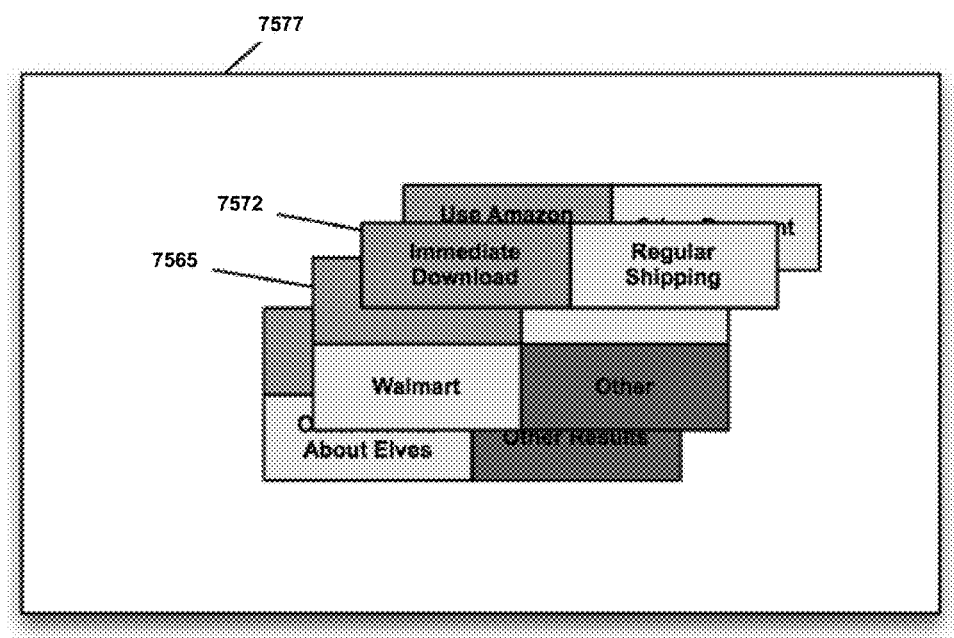
FIG. 21A illustrates a user interface with a lower layer depiction according to an example embodiment of the present application.

FIG. 21A is a user interface depiction 2100 of lower layers of a menu stack configuration according to example embodiments. Referring to FIG. 21A, the configuration layout 7577 provides an example where the user selects another link. For example, the next layer after the user has selected another link is presented. The application updates the lower layers once the user selects the "Amazon" link 7565. The choices for the user when ordering from AMAZON are "Immediate Download" 7572 and "Regular Shipping", with "Immediate Download" being the selection previously taken by the user and/or other users as indicated by querying the historical database 15 and/or the search engine(s) 14 as indicated by the popular color 'green'.

Figure 21B:
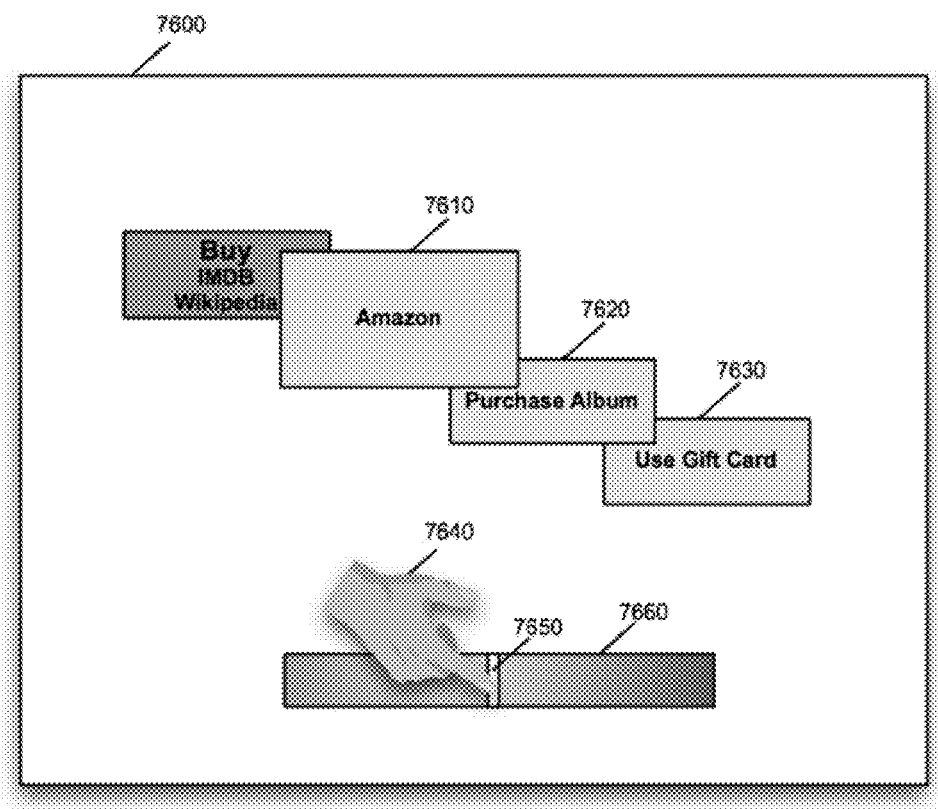
FIG. 21B illustrates a user interface with an altering active search box option according to an example embodiment of the present application.

FIG. 21B illustrates an example of an alternative selection operation by utilizing the sliding bar configuration according to example embodiments. The interface configuration 7600 includes an original search being altered by the user changing the search results of an active box 7600. In this scenario, the user has previously made the second search results box active 7610. This is accomplished by moving the input mechanism(s) over the second box. The application responds by making the box active and enlarging it on the display. The user 7640 then moves the selection mechanism selection indicator 7650 to the 'yellow' area of the selection mechanism bar 7660. This causes the application to change the color of the active box to yellow reflecting the color of the selection mechanism selection, and change the link to "Amazon", the first search result with the yellow color. If the user continues to move the selection mechanism selection 7650 to the right, the application would respond with the second search result in the 'yellow' color, which is "WALMART".

As the user removes the input mechanism(s) 7640 on the slider component 7660, the application responds by sending the query historical message to query the previous actions of the user. When the query historical response message is received in response, the application displays the results in the boxes below the currently active box 7610 including boxes 7620 and 7630. These results are based on the user having selected the same quadrant for each selection. Permitting the user to change the selections by the use of a selection mechanism, the user can navigate between the options that reflect previously chosen actions of the same user. This interface permits navigation options in a display with minimal area, for example, a mobile device. The use of color communicates with the user what the application deems as the preferable action with respect to the user's previously selected actions. The selection capability permits the user to alter the search results in a manner that allows a high level of usability with minimal display area due to the dynamic nature of the selection operations. Once the user has made the proper selections through all of the boxes, to complete the transaction or otherwise complete the search functionality, the user selects the link in the bottom or right-most box and the application responds with the functionality of the user having selected this result for the search result.

In another example embodiment, the results can be positioned in any location within the shape, and/or within the shape and/or exterior to the shape. The selection capability in this scenario is in the middle of the display with the corresponding results on the edges of the selection capability. For example, if the selection capability is a rectangular area, the results are displayed at each of the corners of the rectangular area. As the user moves the input mechanism around the selection capability, the search results are updated at the edges of the area. This implementation may or may not also include another selection capability either inside or outside the first selection capability. This second selection capability can be utilized to traverse through the different levels of the search results.

Figure 22A:
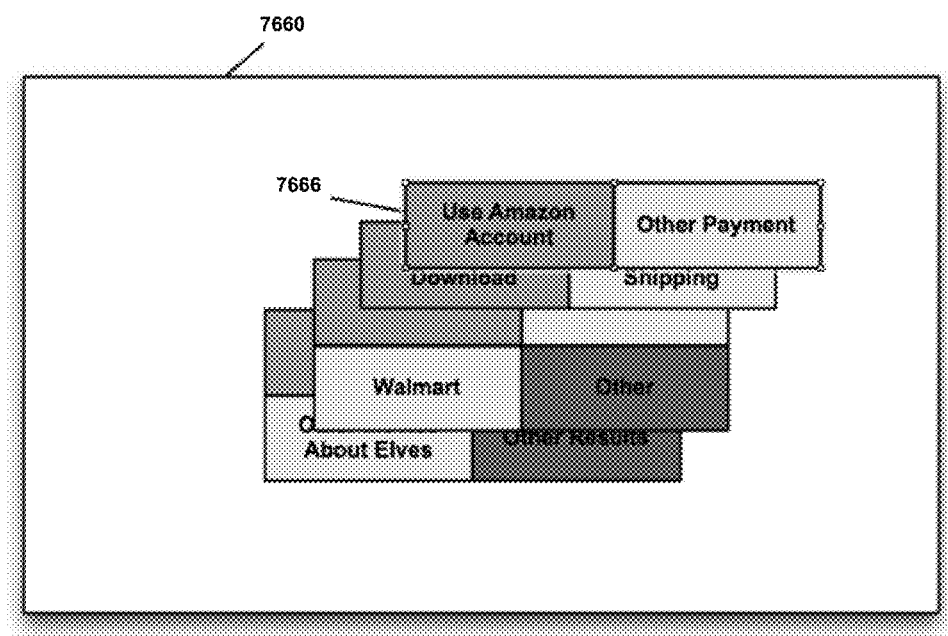
FIG. 22A illustrates a user interface with a bottom layer depiction according to an example embodiment of the present application.

FIG. 22A illustrates a depiction of a bottom layer 2200 when the user selects another link according to example embodiments. Referring to FIG. 22A, the example configuration 7660 provides that the application updates the bottom layer once the user selects either "Immediate Download" or "Regular Shipping" from the previous layer. There are two more options then presented 7666 for the user, such as "Use Amazon Account" or "Other Payment", with "Use Amazon Account" being the selection previously selected by the user and/or other users as indicated by querying the historical database 15 and/or the search engine(s) 14 as indicated by the 'green' color. Once the user selects one of the options, then the transaction is finalized by the application by either sending the user to the AMAZON website or through the application's GUI.

Figure 22B:
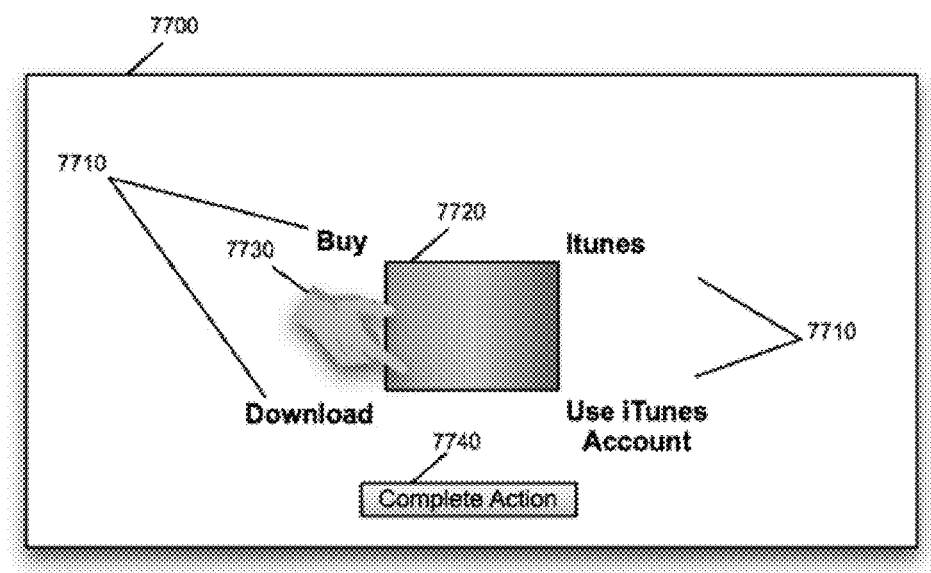
FIG. 22B illustrates a user interface with a dynamic menu according to an example embodiment of the present application.

FIG. 22B illustrates a user interface depiction 2250 of a dynamic menu for the selection criteria according to example embodiments. In FIG. 22B, another implementation is depicted with the alternate selection capability 7700. In this depiction, the dynamic menu selection capability 7720 is a shape (for example a box shape) wherein the current search results 7710 are displayed on the corners of the selection capability. The search results 7710 are displayed relating to where the user has moved the input mechanism 7730. For example, if the user has selected the left most (green) area of the dynamic menu selection capability 7720, the search results will reflect those selection results that are the most popular of either the user-database in the system server 22, or the historical database 15. If the user moves the input mechanism 7730 to the middle area (yellow), then the search results will reflect those search results that are less than the most popular search results. As the user moves the input mechanism 7730 around the dynamic menu selection capability 7720, the search results 7710 are updated to reflect the current selection. Furthermore, when the user moves the input mechanism 7730 around the dynamic menu selection capability 7720, the application responds by sending the query message to the system server 22 to query the previous actions of the user. When the query response message is received from the system server 22 in response, the application updates the selections 7710 so the result can be finalized 7740.

In another example embodiment, the application sends a query top hits message to the system server 22 to query for the top hits from the system server 22 and/or the search engine(s) 14. The response top hits message is received in response, the application updates the selections. In another embodiment, the concept of "locking" is introduced into the application. The locking of a search result permits the user through interfacing with the GUI to communicate with the application to not have the locked result updated in future search results. The user can touch, swipe, or perform another similar interaction with the GUI permitting the search result to be locked so the search result will be altered to reflect that it is locked, for example a change in color, bold the style of the font, or another indication that indicates the locked search result is varied from the other non-locked search results. This locking action as related to a search result may provide that the locked search element is sent in the outgoing query message either the query historical message sent to the system server 22, or the query top hits message 2020 sent to the search engines 14, and modified to reflect the locking status by modifying a bit in the message. By locking the search result, the system server 22 performs searching based on the certainty that the user desires to perform this action (i.e., if the user has locked the "Buy" search result, the system server 22 will perform searching based on the purchasing of the item being searched.

The locked search element will not be updated by the application upon reception of the search results from either the system server 22 or the search engine(s) 14. For example purposes, referring to FIG. 20A a depiction of the user touching another Link, the user locks the upper, 'yellow' quadrant entitled "AMAZON". This indicates that the user is only interested in future search results pertaining to the AMAZON store. When the user continues to click on other search result boxes 7420, the lower, yellow quadrant entitled "Amazon" would remain and not be updated as the other, unlocked results are modified according to the search responses.

FIG. 22C illustrates a table 2280 with various different levels according to example embodiments of the present application. Referring to FIG. 22C, the results of the most popular results "green" are clearly greater for the various levels included in the menu options. Yellow and red results are less popular and are used to help the user identify the search result popularity via a color coded menu option which may be selected and brought to the foreground at any time. For example, if a user selects any portion of the scroll bar then whatever color or color combination is selected will be the basis for the menu options presented.

Figure 23:
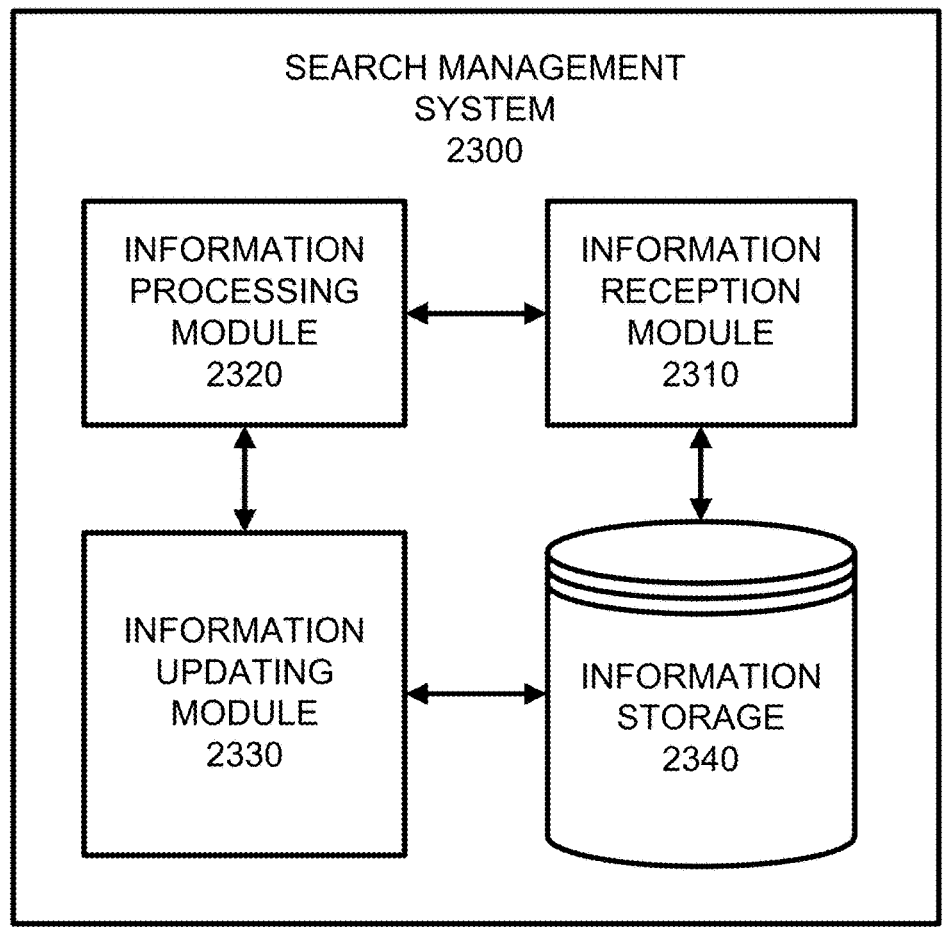
FIG. 23 illustrates a system configuration configured to perform one or more of the example embodiments of the present application.

FIG. 23 illustrates an example system configuration according to example embodiments. Referring to FIG. 23, the search management system 2300 includes a series of modules including an information reception module 2310 for receiving information and sorting the information in accordance with a processing algorithm executed by an information processing module 2320, the information storage 2340 may be a databank that stores search queries, preferences, inferences and other user specific information that may be applied to a search query input of a user. The search query may apply other information stored in the databank 2340 to arrive at optimized search results.

Figure 24A:
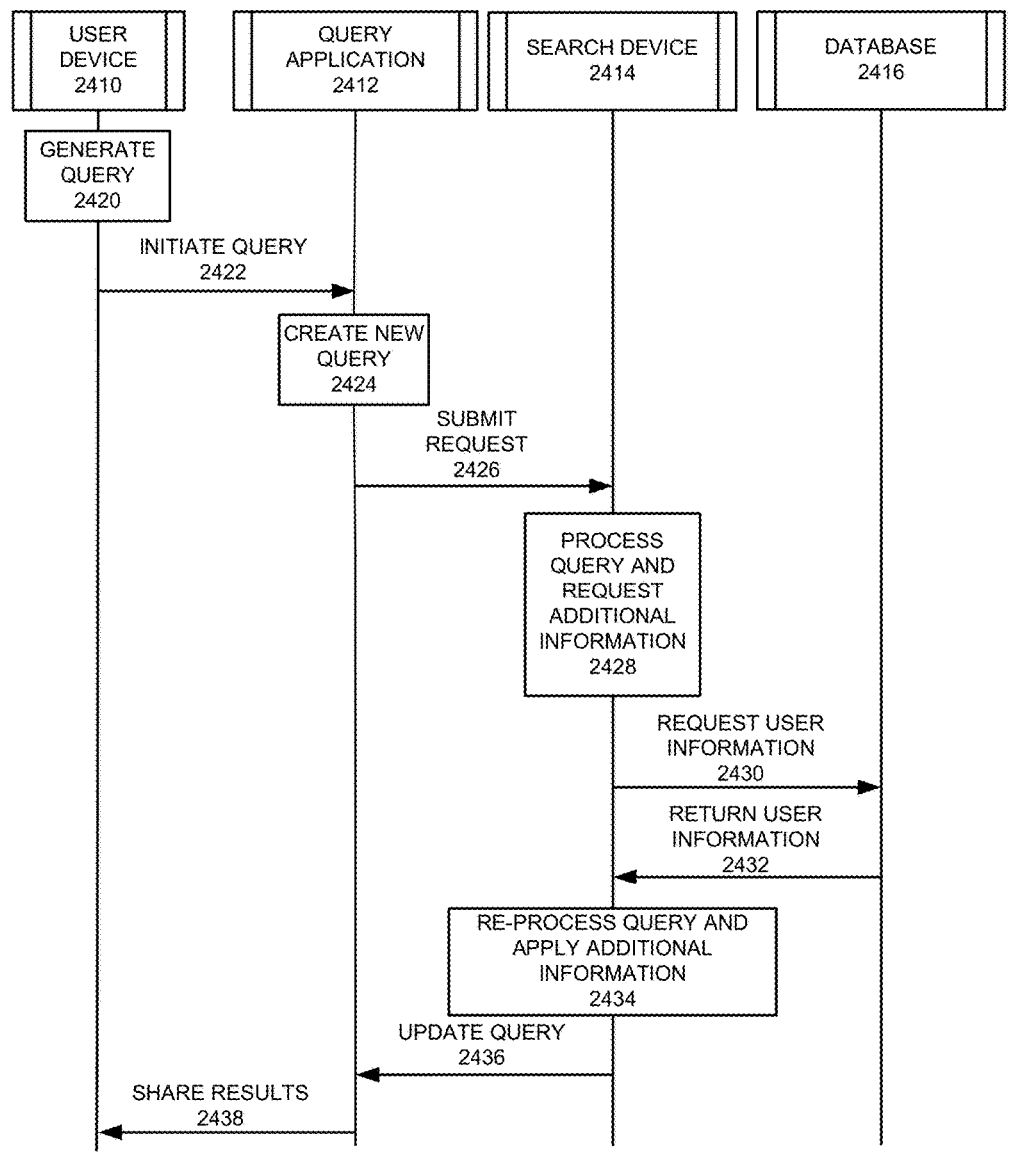
FIG. 24A illustrates a systems signaling diagram according to an example embodiment.

FIG. 24A illustrates a system communication configuration 2400 according to example embodiments of the present application. Referring to FIG. 24A, the user device 2410 may be a smartphone, laptop or other computing device that is operated by a user and which is the starting point of a search query entered by a user. The user device may operate a search agent which is in communication with a search engine, search server, information database, cloud-based platform, etc. The search engine may be a browser or other application that communicates with the user's device and a query application 2412 operated by a search device/server 2414. A database 2416 may store user information that is specific to a user or group of users who perform queries regularly including personal account information, preferences, previous searches, etc.

In operation, the user device 2410 may generate a query 2420 with original search terms inputted by a user that is transmitted to a query application 2412 operated on server in the cloud or other remote site. The query request may be received 2422 and a new query may be created 2424 and forwarded 2426 in a request message to the search device or server 2414 for processing. The search device 2414 may process the query and request additional information 2428 based on the user account, previous searches from the user, previous searches from other users, updated information from popular sites, etc. The database 2416 may receive the request 2430 and return user information 2432 specific to the user, such as specific terms used in a similar query previously and which were not used in the present query, or known preferences or known transactions conducted by the user. The search device 2414 may then re-process the query and apply additional information 2434 retrieved from the database 2416. The search may then be re-processed 2434 based on the original user input and the applied information identified in the database 2416. The query can be updated 2436 and forwarded to the use device 2410 as a shared result 2438.

The user account may include various pre-stored search criteria as noted above. The pre-stored search criteria provides previous search history of searches performed by the user account and previous search history of other user accounts. The operations may then include identifying the search query input as being associated with a predetermined category including at least one sub-category stored in the user account. For example, like the rock music example mentioned previously, the rock music may be the query input from the user and once the category or topic is known by the query application, the sub-category (i.e., heavy metal, alternative, punk, etc.) may be applied to modify the original query. The sub-category may then be selected and applied to the search query input prior to submitting the query to the search application. The operations may also include providing results of the query in a multi-portion user interface with a color scheme including at least two colors being used to designate different portions of the user interface. For instance, more popular search results are assigned a first color and less popular search results are assigned a second color of the different colors. Additional colors may be used to identify less popular results from others, less popular results from the user's previous searches and other topics altogether that are related but not the most relevant. The various colors help the user identify the prioritization with the most relevant being one color among the various colors in the selection menu (e.g., scroll bar, line bar, etc.). The search query input may be combined with the sub-category to obtain a modified search result. The modified search result may include the search query input and at least one genre identified by the sub-category (e.g., classic rock, alternative rock, metal rock, punk rock, etc.). The genre associated with the sub-category may be based on a frequency of user submitted queries associated with the genre. For instance, if the user submits queries mostly for alternative rock 78% of the time and the other types all less than that number (e.g., 67%, 55%, 46%), then the default preference genre may be alternative rock with the highest query percentage and may be applied automatically without user specific action.

Figure 24B:
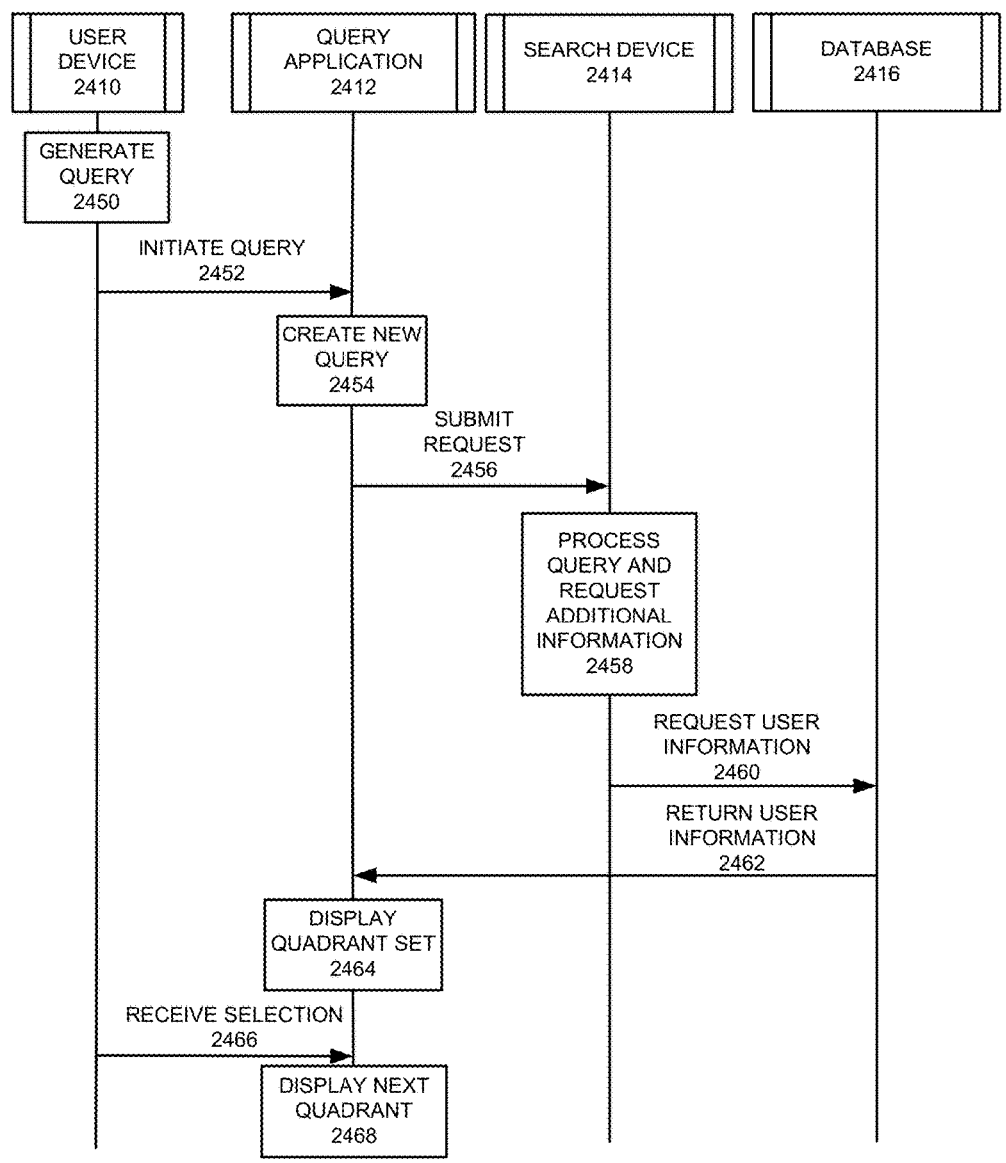
FIG. 24B illustrates another systems signaling diagram according to an example embodiment.

FIG. 24B illustrates a system communication configuration 2450 according to example embodiments of the present application. Referring to FIG. 24B, the user device 2410 may be a smartphone, laptop or other computing device that is operated by a user and which is the starting point of a search query entered by a user. The user device may operate a search agent which is in communication with a search engine, search server, information database, cloud-based platform, etc. The search engine may be a browser or other application that communicates with the user's device and a query application 2412 operated by a search device/server 2414. A database 2416 may store user information that is specific to a user or group of users who perform queries regularly including personal account information, preferences, previous searches, etc.

In operation, the user device 2410 may generate a query 2450 with original search terms inputted by a user that is transmitted to a query application 2412 operated on server in the cloud or other remote site. The query request may be received 2452 and a new query may be created 2454 and forwarded 2456 in a request message to the search device or server 2414 for processing. The search device 2414 may process the query and request additional information 2458 based on the user account, previous searches from the user, previous searches from other users, updated information from popular sites, etc. The database 2416 may receive the request 2460 and return user information 2462 specific to the user, such as specific terms used in a similar query previously and which were not used in the present query, or known preferences or known transactions conducted by the user.

The database may be queried to retrieve previous queries related to the search query input from the user and then perform the query based on the search query input and the known history of user behavior. The results may then be categorized based on the previous queries and a user specified priority of information may be organized prior to displaying the information on a user interface. The pre-stored search criteria provides previous search history of searches performed by the user account and previous search history of other user accounts. The predetermined number of result categories may be selected and a user display interface may be populated with the predetermined number of result categories in a first quadrant set 2464 of several quadrant sets. The predetermined number of result categories may be four but could be larger for each quadrant presented. The user may perform a selection 2466 and the next quadrant set 2468 may be displayed which was previously hidden or behind the initial quadrant set (see FIG. 20A). Also, once a selection is received, a plurality of additional search result categories may then be presented to populate at least one additional quadrant set so each portion of the additional quadrant set has a different search result. Also, assuming a selection of at least one portion of the first quadrant set is received, then the second quadrant set may be displayed before the first quadrant set assuming the selection of the first portion of the first quadrant set is linked to the second quadrant set by topic or sub-topic category.

Figure 24C:
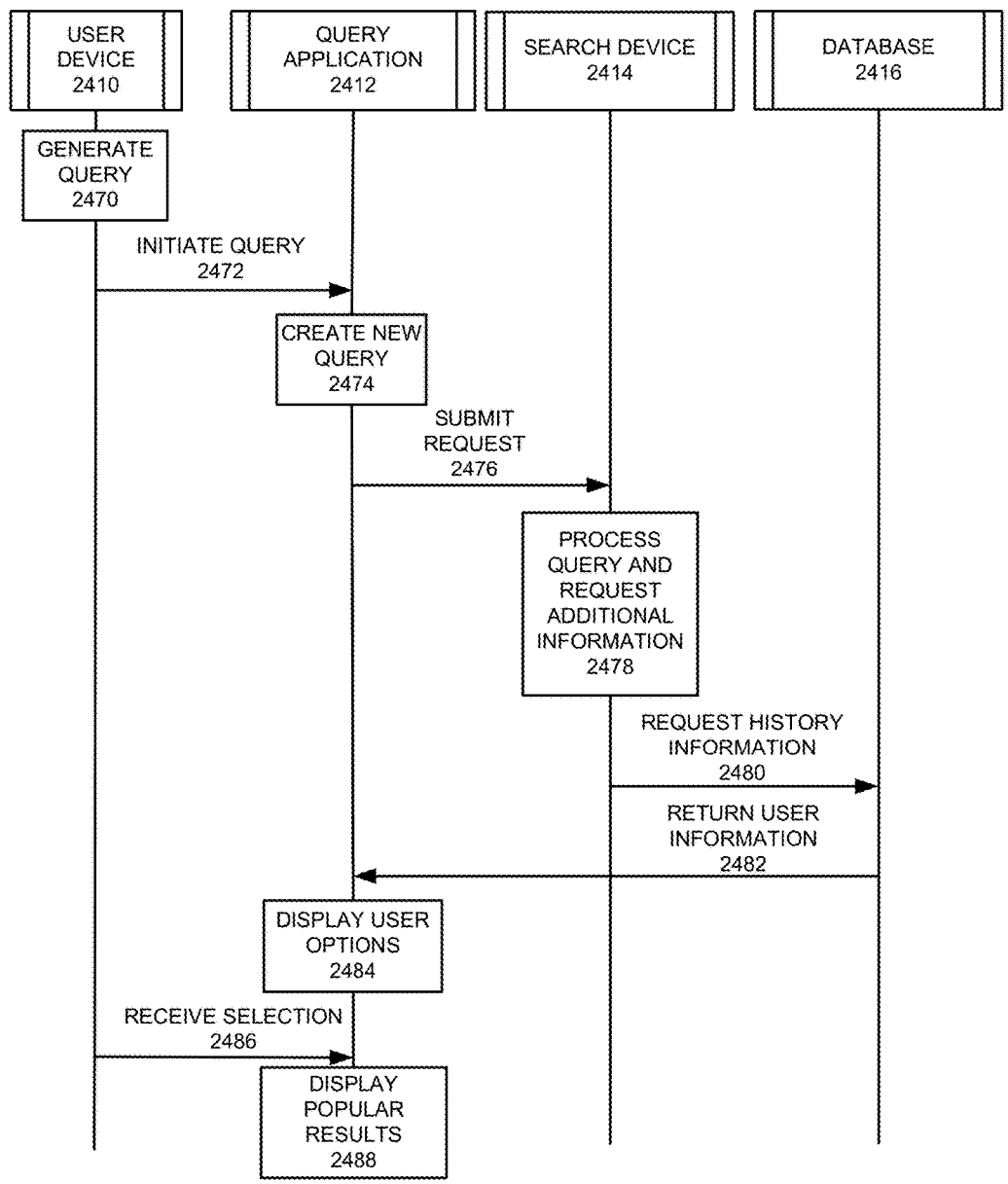
FIG. 24C illustrates yet another systems signaling diagram according to an example embodiment.

FIG. 24C illustrates a system communication configuration 2480 according to example embodiments of the present application. Referring to FIG. 24C, the user device 2410 may be a smartphone, laptop or other computing device that is operated by a user and which is the starting point of a search query entered by a user. The user device may operate a search agent which is in communication with a search engine, search server, information database, cloud-based platform, etc. The search engine may be a browser or other application that communicates with the user's device and a query application 2412 operated by a search device/server 2414. A database 2416 may store user information that is specific to a user or group of users who perform queries regularly including personal account information, preferences, previous searches, etc.

In operation, the user device 2410 may generate a query 2470 with original search terms inputted by a user that is transmitted to a query application 2412 operated on server in the cloud or other remote site. The query request may be received 2472 and a new query may be created 2474 and forwarded 2476 in a request message to the search device or server 2414 for processing. The search device 2414 may process the query and request additional information 2478 based on the user account, previous searches from the user, previous searches from other users, updated information from popular sites, etc. The database 2416 may receive the request 2480 and return user information 2482 specific to the user, such as specific terms used in a similar query previously and which were not used in the present query, or known preferences or known transactions conducted by the user. User options may be displayed 2484 and a selection 2486 by the user may trigger certain popular results to be displayed 2488 as described in further detail below. The operations may also include receiving a search query input from a user device including at least one search term, querying a history database to access previous queries related to the search query input and performing a query based on the search query input and the previous queries.

Results of the query are categorized based on the previous queries and a previous selection operation performed by the user, such as purchase, access, sub-category selections, etc. The plurality of search results are then displayed in a user interface including a plurality of different selection options each related to a topic of the search query. Then, the topic of the query is determined by identifying a set of most popular selections made by previous search results and user selections. The set of most popular selections includes at least one purchase option to purchase content or a product related to the topic, at least one vendor option to perform the purchase option and at least one account to apply to the purchase option. The search results are then displayed in the user interface, which includes displaying a scroll bar with at least two different colors to identify search result validity and relevancy. A first color may indicates more popular search results based on a numerical function, such as above 50% relevancy based on search terms or above 75% relevancy, etc., from previous searches performed and a second color indicates lesser popular search results below those established thresholds. Intermittent colors between the two colors may be shown as a faded scroll bar as green fades to yellow and then to red, each pixel or slight variation in color from left to right may indicate at least one more search result that is less relevant than the previous result. The scroll bar may include at least three colors with each color indicating a lesser popular search result than a previous color in the scroll bar. All colors in between two colors at any given time are a variation of the most relevant and the least relevant results. Also, the procedure may include identifying at least one specific sub-topic related to the topic of the query, and applying the specific sub-topic to the query prior to performing the query.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 25 illustrates an example network element 2500, which may represent any of the above-described network components, etc.

Figure 25:
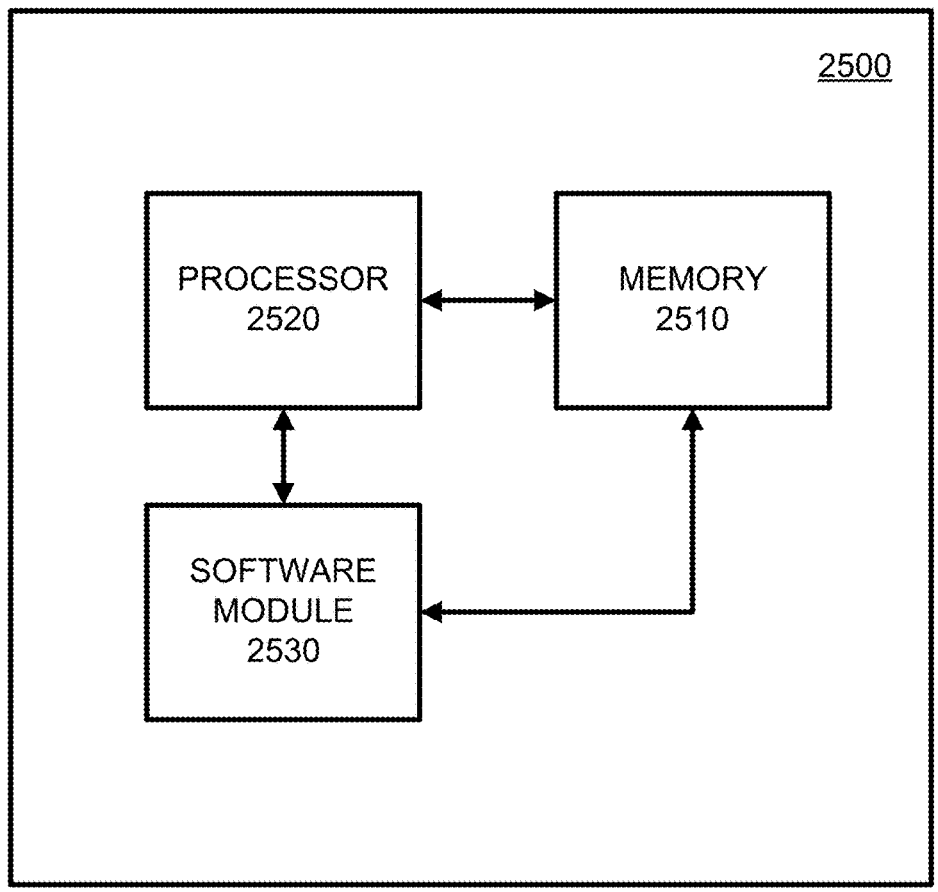
FIG. 25 illustrates an example network entity device configured to store instructions, software, and corresponding hardware for executing the same, according to example embodiments of the present application.

As illustrated in FIG. 25, a memory 2510 and a processor 2520 may be discrete components of the network entity 2500 that are used to execute an application or set of operations. The application may be coded in software in a computer language understood by the processor 2520, and stored in a computer readable medium, such as, the memory 2510. The computer readable medium may be a non-transitory computer readable medium that includes tangible hardware components in addition to software stored in memory. Furthermore, a software module 2530 may be another discrete entity that is part of the network entity 2500, and which contains software instructions that may be executed by the processor 2520. In addition to the above noted components of the network entity 2500, the network entity 2500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 23 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a search query input from a user device comprising at least one search term;
   querying a database to access a user account configured by a user associated with the user device, the user account associated with the user device;
   retrieving at least one pre-stored search criteria from the user account;
   combining the pre-stored search criteria with the search query input to create a modified search query input;
   transmitting the modified search query input to a search application;
   providing first search results associated with the modified search query to the user device that displays a first color coded representation in a first format and a second color coded representation in a second format, the first and second color coded representations reflecting different levels of usefulness to the user, the first and second formats reflecting different quadrants of a display of the user device; and providing second search results that are based on user manipulation of the second color coded representation of the first search results, providing second search results comprising displaying the first search results in a first box and displaying second search results in a second box displayed behind the first box, user manipulation of the second color coded representation of the first search results comprising:
- selecting, by the user, a quadrant of the display corresponding to the second color coded representation by hovering a pointing device over the quadrant corresponding to the second color coded representation; and
- querying the database to obtain the second search results.

2. The method of claim 1, wherein the pre-stored search criteria provides previous search history of searches performed by the user account and previous search history of other user accounts.

3. The method of claim 1, further comprising:
- identifying the search query input as being associated with a predetermined category comprising at least one sub-category stored in the user account; and
- selecting the at least one sub-category and applying the sub-category to the search query input prior to submitting the modified search query input to the search application.

4. The method of claim 1, further comprising:
- providing the first and second search results with a color scheme including at least two colors being used to designate different portions of the user interface, and wherein more popular search results for the user are assigned a first color and less popular search results for the user are assigned a second color of the at least two colors.

5. The method of claim 1, wherein the first search results comprise the search query input and at least one genre identified by a sub-category.

6. The method of claim 5, further comprising:
- selecting the genre associated with the sub-category based on a frequency of user submitted queries associated with the genre.

7. An apparatus comprising:
- a receiver configured to receive a search query input from a user device comprising at least one search term;
- a processor configured to
- query a database to access a user account comprising personal interests of a user, the user account associated with the user device;
- retrieve at least one pre-stored search criteria from the user account;
- combine the pre-stored search criteria with the search query input to create a modified search query input; and
- a transmitter configured to:
- transmit the modified search query input to a search application;
- provide first search results associated with the modified search query to the user device that displays a first color coded representation in a first format and a second color coded representation in a second format, the first and second color coded representations reflecting different levels of usefulness to the user, the first and second formats reflecting different quadrants of a display of the user device; and provide second search results that are based on user manipulation of the second color coded representation of the first search results, the provided second search results comprising the first search results displayed in a first box and second search results displayed in a second box behind the first box, user manipulation of the second color coded representation of the first search results comprising:
- select, by the user, a quadrant of the display corresponding to the second color coded representation by the user hovers a pointer device over the quadrant that corresponds to the second color coded representation; and
- query the database to obtain the second search results.

8. The apparatus of claim 7, wherein the pre-stored search criteria provides previous search history of searches performed by the user account and previous search history of other user accounts.

9. The apparatus of claim 7, wherein the processor is further configured to identify the search query input as being associated with a predetermined category comprising at least one sub-category stored in the user account, and
- select the at least one sub-category and applying the sub-category to the search query input prior to submitting the modified search query input to the search application.

10. The apparatus of claim 7, wherein the processor is further configured to provide the first and second search results with a color scheme including at least two colors being used to designate different portions of the user interface, and wherein more popular search results for the user are assigned a first color and less popular search results for the user are assigned a second color of the at least two colors.

11. The apparatus of claim 7, wherein the first search results comprise the search query input and at least one genre identified by a sub-category.

12. The apparatus of claim 11, wherein the processor is further configured to
- select the genre associated with the sub-category based on a frequency of user submitted queries associated with the genre.

13. A non-transitory computer readable storage medium configured to store instructions that when executed cause a processor to perform:
- receiving a search query input from a user device comprising at least one search term;
- querying a database to access a user account configured by a user associated with the user device, the user account associated with the user device;
- retrieving at least one pre-stored search criteria from the user account;
- combining the pre-stored search criteria with the search query input to create a modified search query input;
- transmitting the modified search query input to a search application;
- providing first search results associated with the modified search query to the user device that displays a first color coded representation in a first format and a second color coded representation in a second format, the first and second color coded representations reflecting different levels of usefulness to the user, the first and second formats reflecting different quadrants of a display of the user device; and
- providing second search results that are based on user manipulation of the second color coded representation of the first search results, providing second search results comprising displaying the first search results in a first box and displaying second search results in a second box displayed behind the first box, user manipulation of the second color coded representation of the first search results comprising:
   selecting, by the user, a quadrant of the display corresponding to the second color coded representation by hovering a pointing device over the quadrant corresponding to the second color coded representation; and
   querying the database to obtain the second search results.

14. The non-transitory computer readable storage medium of claim 13, wherein the pre-stored search criteria provides previous search history of searches performed by the user account and previous search history of other user accounts.

15. The non-transitory computer readable storage medium of claim 13, wherein the processor is further configured to perform:
   identifying the search query input as being associated with a predetermined category comprising at least one sub-category stored in the user account; and
   selecting the at least one sub-category and applying the sub-category to the search query input prior to submitting the modified search query input to the search application.

16. The non-transitory computer readable storage medium of claim 13, wherein the processor is further configured to perform:
   providing the first and second search results with a color scheme including at least two colors being used to designate different portions of the user interface, and wherein more popular search results for the user are assigned a first color and less popular search results for the user are assigned a second color of the at least two colors.

17. The non-transitory computer readable storage medium of claim 13, wherein the first search results comprise the search query input and at least one genre identified by a sub-category, and the processor is further configured to perform selecting the genre associated with the sub-category based on a frequency of user submitted queries associated with the genre.

* * * * *